(12) United States Patent
Yamashita et al.

(10) Patent No.: US 10,308,338 B2
(45) Date of Patent: Jun. 4, 2019

(54) DEVICE AND METHOD FOR STARTING INTERNAL COMBUSTION ENGINE

(71) Applicant: Mitsubishi Heavy Industries, Ltd., Tokyo (JP)

(72) Inventors: Yukio Yamashita, Tokyo (JP); Yoshihisa Ono, Tokyo (JP); Musashi Sakamoto, Tokyo (JP); Takeshi Tsuji, Tokyo (JP); Akihiro Miyanagi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/540,986

(22) PCT Filed: Aug. 7, 2015

(86) PCT No.: PCT/JP2015/072577
§ 371 (c)(1),
(2) Date: Jun. 29, 2017

(87) PCT Pub. No.: WO2016/111034
PCT Pub. Date: Jul. 14, 2016

(65) Prior Publication Data
US 2018/0001984 A1    Jan. 4, 2018

(30) Foreign Application Priority Data

Jan. 5, 2015    (JP) .................................. 2015-000386

(51) Int. Cl.
*F02B 37/04*    (2006.01)
*B63H 21/14*    (2006.01)
(Continued)

(52) U.S. Cl.
CPC ............. *B63H 21/14* (2013.01); *F02B 33/34* (2013.01); *F02B 37/04* (2013.01); *F02B 37/10* (2013.01);
(Continued)

(58) Field of Classification Search
CPC    F02B 37/04; F02B 37/10; F02B 37/11; F02B 37/14; F02B 33/34; F02B 33/40;
(Continued)

(56) References Cited

U.S. PATENT DOCUMENTS 4,680,933 A    7/1987    Bozung et al.
6,807,934 B2 *  10/2004    Kataoka ................ F02N 11/006
                                                                123/179.3
(Continued)

FOREIGN PATENT DOCUMENTS

DE                19518317 A1    11/1996
DE        102011075876 A1    11/2012
(Continued)

OTHER PUBLICATIONS

Ono, et al, "Application of a Large Hybrid Turbocharger for Marine Electric-power Generation," Mitsubishi Heavy Industries Technical Review, vol. 49, No. 1, Mar. 2012, 9 Pages.
(Continued)

*Primary Examiner* — John Kwon
*Assistant Examiner* — Johnny H Hoang
(74) *Attorney, Agent, or Firm* — Berkeley Law & Technology Group, LLP

(57) ABSTRACT

A device and a method for starting an internal combustion engine, provided with an exhaust turbine turbocharger, an electric motor generator, a power storage unit, an engine rotation starter device, injectors, and a control device that controls the electric motor generator, the engine rotation starter device, and the injectors, wherein when an engine
(Continued)

rotation activation start signal is input and the rotational frequency of the exhaust turbine turbocharger reaches an engine rotation-activation-starting rotational frequency, the control device starts driving the engine rotation starter device, and when the engine rotational frequency reaches a fuel-supply-starting rotational frequency, the control device starts driving the injectors, thus improving the starting performance of the internal combustion engine.

7 Claims, 14 Drawing Sheets

(51) Int. Cl.
  *F02B 37/11*  (2006.01)
  *F02D 41/06*  (2006.01)
  *F02B 37/10*  (2006.01)
  *F02B 39/10*  (2006.01)
  *F02D 41/00*  (2006.01)
  *F02B 33/34*  (2006.01)
  *F02B 37/14*  (2006.01)
  *F02B 37/12*  (2006.01)
  *F02D 41/38*  (2006.01)
  *F02N 11/00*  (2006.01)
  *F02N 9/04*  (2006.01)
  *F02N 11/08*  (2006.01)

(52) U.S. Cl.
  CPC .............. *F02B 37/11* (2013.01); *F02B 37/14* (2013.01); *F02B 39/10* (2013.01); *F02D 41/0007* (2013.01); *F02D 41/062* (2013.01); *F02B 2037/122* (2013.01); *F02D 41/3827* (2013.01); *F02D 2041/389* (2013.01); *F02D 2200/101* (2013.01); *F02N 9/04* (2013.01); *F02N 11/00* (2013.01); *F02N 2011/0885* (2013.01); *F02N 2011/0896* (2013.01); *F02N 2200/022* (2013.01); *F02N 2200/063* (2013.01); *Y02T 10/144* (2013.01)

(58) Field of Classification Search
  CPC .......... F02B 33/44; F02D 23/00; F02D 23/02; F02N 9/04; B63H 21/14
  USPC ........... 123/179.16, 179.18, 179.3, 563–565, 123/559.1; 701/113
  See application file for complete search history.

(56) References Cited

U.S. PATENT DOCUMENTS

| | | | | |
|---|---|---|---|---|
| 7,395,786 | B2 * | 7/2008 | Leone | F02D 19/0684 |
| | | | | 123/1 A |
| 8,271,183 | B2 * | 9/2012 | Uhrich | F02B 33/40 |
| | | | | 123/179.16 |
| 8,600,648 | B2 * | 12/2013 | Hashemi | F02D 41/008 |
| | | | | 123/179.3 |
| 9,032,927 | B1 * | 5/2015 | Redon | F02B 75/12 |
| | | | | 123/179.16 |
| 9,874,191 | B2 * | 1/2018 | Xiao | F02N 11/0829 |
| 2004/0206083 | A1 | 10/2004 | Okuyama et al. | |
| 2004/0221837 | A1 * | 11/2004 | Kassner | F02D 41/0007 |
| | | | | 123/565 |
| 2011/0048119 | A1 * | 3/2011 | Hansen | G01M 15/14 |
| | | | | 73/118.01 |
| 2012/0111305 | A1 * | 5/2012 | Pursifull | F01N 11/00 |
| | | | | 123/406.76 |
| 2013/0239568 | A1 | 9/2013 | Krishnan et al. | |
| 2015/0083092 | A1 * | 3/2015 | Desai | F02D 41/064 |
| | | | | 123/556 |
| 2015/0345490 | A1 * | 12/2015 | Bremeier | F04B 49/06 |
| | | | | 417/22 |

FOREIGN PATENT DOCUMENTS

| | | |
|---|---|---|
| DE | 102013210255 A1 | 12/2014 |
| EP | 0178534 A1 | 4/1986 |
| GB | 2140506 A | 11/1984 |
| GB | 2502269 A | 11/2013 |
| JP | 61106921 A | 5/1986 |
| JP | 11332107 A | 11/1999 |
| JP | 2013224672 A | 10/2013 |
| WO | 2012156573 A1 | 11/2012 |
| WO | 2013138196 A1 | 9/2013 |
| WO | 2014195070 A1 | 12/2014 |

OTHER PUBLICATIONS

International Search Report, App. No. PCT/JP2015/072577, dated Nov. 10, 2015, 13 Pages.
Extended European Search Report, App. No. 15876907.5, dated Dec. 7, 2017, 7 Pages.
Communication Pursuant to Article 94(3) EPC, App. No. 15876907.5-1004, dated Nov. 14, 2018, 5 Pages.

* cited by examiner

DEVICE AND METHOD FOR STARTING INTERNAL COMBUSTION ENGINE

TECHNICAL FIELD

The present invention relates to a device and a method for starting an internal combustion engine including a turbocharger.

BACKGROUND. ART

For example, an internal combustion engine marines equipped with a turbocharger in order to improve the fuel efficiency and to reduce $CO_2$ is flue gas. The turbocharger drives a turbine and a compressor by utilizing the flue gas discharged from the internal combustion engine and supplies compressed intake air to the internal combustion engine, thereby improving the output of the internal combustion engine. In addition, there is a turbocharger power generation device which generates power by a motor using a surplus of energy driving the compressor of the turbocharger. In the turbocharger power generation device, the motor is directly connected to the turbocharger, and the surplus of the flue gas energy is collected as electric energy, thereby reducing the power generation amounts of other inboard motors.

PTL 1 discloses an example of such a turbocharger power generation device.

CITATION LIST

Patent Literature

[PTL 1] Japanese Unexamined Patent Application Publication No. 2013-224672

Non Patent Literature

[NTL 1] Mitsubishi Heavy industries Technical review Vol. 49, No. 1 (2012), New Products & Technologies "Application of a Large Hybrid. Turbocharger for Marine Electric-power Generation"

SUMMARY OF INVENTION

Technical Problem

Meanwhile, as disclosed in NTL 1, when an internal combustion engine starts or is in a low load operation, since sufficient combustion gas cannot be supplied to the internal combustion engine with only a turbocharger, intake air to be supplied to the internal combustion engine is ensured by using an auxiliary blower. However, the auxiliary blower is operated at a uniform speed and supplies a uniform amount of air to the internal combustion engine. Accordingly, at is difficult to supply the required amount of air when the internal combustion engine starts, thereby resulting in a problem of unfavorable starting performance. In addition, there are problems in that the degree of freedom of controlling is low, it is difficult to perform an optimal operation, and the efficiency is poor.

The present invention solves the problems described above, and an object thereof is to provide a device and a method for starting an internal combustion engine, in which the starting performance of the internal combustion engine is improved.

Solution to Problem

In order to realize the object, according to the present invention, there is provided a device for starting an internal combustion engine, including a compressor that supplies combustion gas to the internal combustion engine, an electric motor that drives the compressor, an internal combustion engine rotation starter device that drives the internal combustion engine without supplying any fuel, a fuel supply device that supplies fuel to the internal combustion engine, and a control device that controls driving the electric motor, the internal combustion engine rotation starter device, and the fuel supply device. When the rotational frequency of the compressor reaches an internal combustion engine rotation-activation-starting rotational frequency set in advance, the control device drives the internal combustion engine rotation starter device, and when the rotational frequency of the internal combustion engine reaches a fuel-supply-starting rotational frequency set in advance, the control device starts driving the fuel supply device.

Accordingly, when the rotational frequency of the compressor reaches the internal combustion engine rotation-activation-starting rotational frequency, the internal combustion engine rotation starter device driven, and when the rotational frequency of the internal combustion engine reaches the fuel-supply-starting rotational frequency, the fuel supply device is driven, thereby starting the internal combustion engine. Therefore, without using any additional device such as an auxiliary blower, the internal combustion engine starts by using the electric motor for driving the compressor. Thus, while the equipment cost is restrained from increasing, it is possible to improve the starting performance of the internal combustion engine.

In the device for starting an internal combustion engine according to the present invention, there provided a power storage unit which supplies power to the electric motor, and the power storage unit receives power from an external power source device and stores the power. After storing power in the power storage unit starts and the voltage of the power storage unit reaches a standby voltage set in advance, the control device starts driving the compressor, and when the rotational frequency of the compressor reaches the internal combustion engine rotation-activation-starting rotational frequency, the control device starts driving the internal combustion engine rotation starter device.

Accordingly, there provided the power storage unit in which power for driving the compressor is accumulated. After the voltage of the power storage unit reaches the standby voltage, driving the compressor starts by power of the power storage unit. Thereafter, power from an inboard power system is outputs to the electric motor. Thus, it is possible to appropriately raise the rotational frequency of the compressor and the rotational frequency of the internal combustion engine, and it is possible to execute a smooth start of the internal combustion engine.

In the device for starting an internal combustion engine according to the present invention, when the voltage of the power storage unit reaches the standby voltage, after driving the electric motor starts by power of the power storage unit and the rotational frequency of the compressor becomes the internal combustion engine rotation-activation-starting rotational frequency, the control device maintains the rotational frequency of the compressor at the internal combustion engine rotation-activation-starting rotational frequency, and in a case where an internal combustion engine rotation activation signal is input to the control device, the control device starts driving the internal combustion engine rotation starter device.

Accordingly, in a state where power for driving the compressor is stored in the power storage unit and the rotational frequency of the compressor is maintained at the internal combustion engine rotation-activation-starting rotational frequency, the control device is in a standby state with respect to the internal combustion engine rotation activation signal. Thus, when the internal combustion engine rotation activation signal is input, it is possible to raise the rotational frequency of the compressor and the rotational frequency of the internal combustion engine at an early stage, and it is possible to execute a smooth start of the internal combustion engine.

In the device for starting an internal combustion engine according to the present invention, in a case where the voltage of the power storage unit reaches the standby voltage and the internal combustion engine rotation activation signal is input to the control device, the control device starts driving the electric motor by power of the power storage unit, and when the rotational frequency of the compressor reaches the internal combustion engine rotation-activation-starting rotational frequency, the control device starts driving the internal combustion engine rotation starter device.

Accordingly, in a state where power for driving the compressor is stored in the power storage unit, the control device is in a standby state with respect to the internal combustion engine rotation activation signal. When the internal combustion engine rotation activation signal input, driving the electric motor starts by power of the power storage unit. Thereafter, power from the inboard power system is output to the electric motor and rotation of the compressor is raised. Thus, without consuming any power of the power storage unit in the standby state, it is possible to reduce the power consumption amount.

In addition, according to the present invention, there is provided a method for starting an internal combustion engine, including a step of starting storing power in a power storage unit, a step of driving a compressor by driving an electric motor by power of the power storage unit after the voltage of the power storage unit reaches a standby voltage set in advance, a step of starting rotation of the internal combustion engine without supplying any fuel when the rotational frequency of the compressor reaches an internal combustion engine rotation-activation-starting rotational frequency set in advance, and a step of supplying fuel to the internal combustion engine when the rotational frequency of the internal combustion engine reaches a fuel-supply-starting rotational frequency set in advance.

Accordingly, without using any additional device such as an auxiliary blower, the internal combustion engine starts by using the electric motor for driving the compressor. Thus, while the equipment cost is restrained from increasing, it is possible to improve the starting performance of the internal combustion engine.

In the method for starting an internal combustion engine according to the present invention, after the rotational frequency of the compressor reaches the internal combustion engine rotation-activation-starting rotational frequency, the internal combustion engine rotation-activation-starting rotational frequency is maintained and driving an internal combustion engine rotation starter device starts upon a reception of an internal combustion engine rotation activation signal.

Accordingly, in a state where power for driving the compressor is stored in the power storage unit and the rotational frequency of the compressor is maintained at the internal combustion engine rotation-activation-starting rotational frequency, the control device is in a standby state with respect to the internal combustion engine rotation activation signal. Thus, when the internal combustion engine rotation activation signal is input, it is possible to raise the rotational frequency of the compressor and the rotational frequency of the internal combustion engine at an early stage, and it is possible to execute a smooth start of the internal combustion engine.

In the method for starting an internal combustion engine according to the present invention, the voltage of the power storage unit is maintained after reaching the standby voltage, driving the internal combustion engine rotation starter device starts after driving the electric motor starts by power of the power storage unit upon a reception of the internal combustion engine rotation activation signal and the rotational frequency of the compressor reaches the internal combustion engine rotation-activation-starting rotational frequency.

Accordingly, in a state where power for driving the compressor is stored in the power storage unit, the control device is in a standby state with respect to the internal combustion engine rotation activation signal. When the internal combustion engine rotation activation signal is input, driving the electric motor starts by power of the power storage unit. Thereafter, power from the inboard power system is output to the electric motor and rotation of the compressor is raised. Thus, without consuming any power of the power storage unit in the standby state, it is possible to reduce the power consumption amount.

Advantageous Effects of Invention

According to the device and the method for starting an internal combustion engine of the present invention, it is possible to improve the starting performance of the internal combustion engine.

DESCRIPTION. OF EMBODIMENTS

Hereinafter, with reference to the accompanying drawings, favorable embodiments of a device and a method for starting an internal combustion engine according to the present invention will be described in detail. The present invention is not limited to the embodiments. In addition, in a case where there are a plurality of the embodiments, the present invention also includes a configuration in which the embodiments are combined together.

First Embodiment

Figure 1:
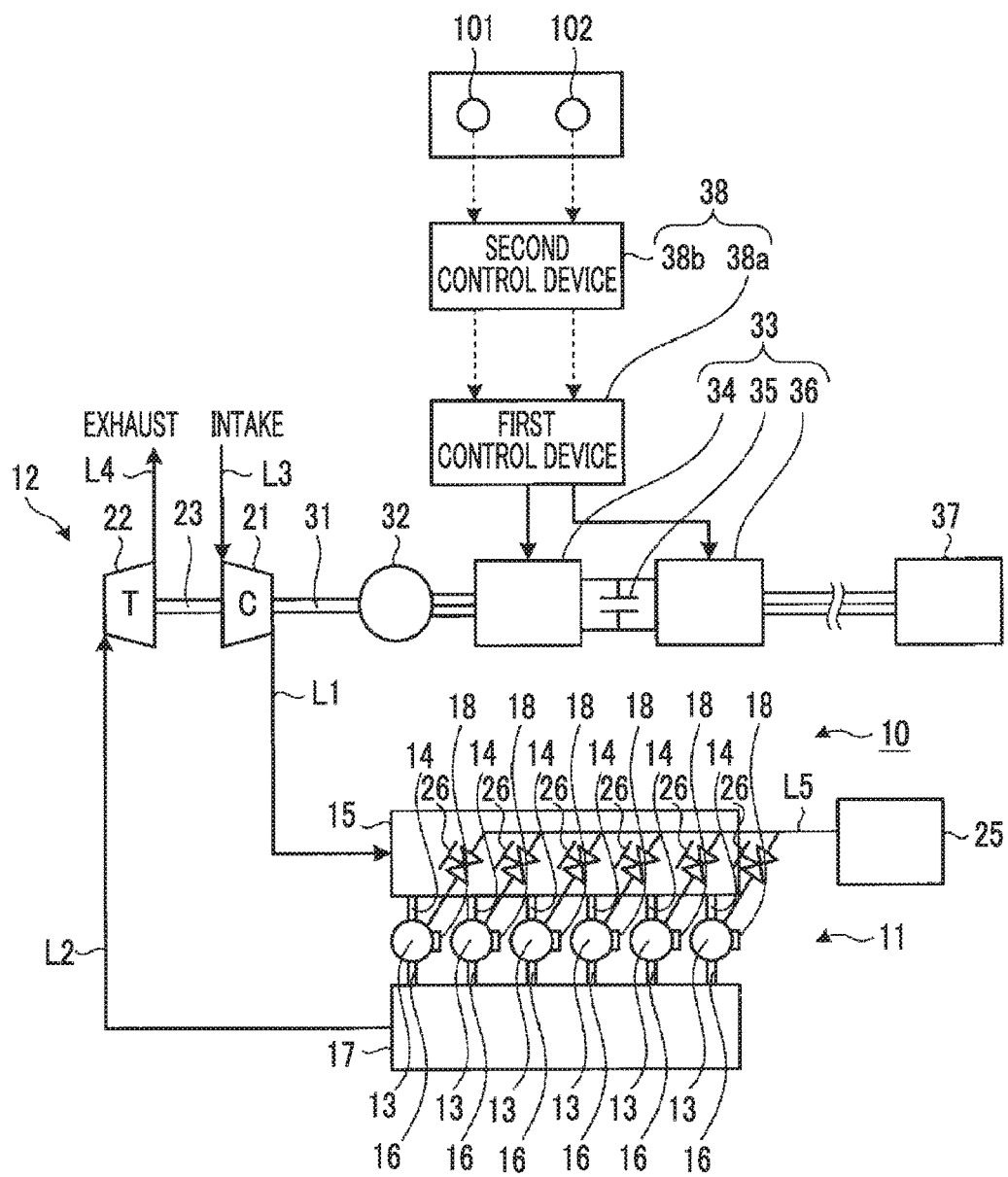
FIG. 1 is schematic configuration diagram illustrating a device for starting an internal combustion engine of a first embodiment.

FIG. 1 is schematic configuration diagram illustrating the device for starting an internal combustion engine of a first embodiment.

In the first embodiment, as illustrated in FIG. 1, a marine diesel engine 10 as the internal combustion engine includes a diesel engine main body 11 and an exhaust turbine turbocharger 12. The diesel engine main body 11 is provided with a plurality of cylinder portions 13. Inside each of the cylinder portions 13, a piston (not illustrated) is supported in a freely-reciprocating manner. A lower portion of each piston is interlocked with a crankshaft via a crosshead.

An intake manifold 15 is interlocked with each of the cylinder portions 13 via an intake port 14, and an exhaust manifold 17 interlocked with each of the cylinder portions 13 via an exhaust port 16. The intake manifold 15 is interlocked with a compressor 21 of the exhaust turbine turbocharger 12 via an intake pipe L1. In addition, the exhaust manifold 17 is interlocked with turbine 22 of the exhaust turbine turbocharger 12 via an exhaust pipe 12. In addition, inside each of the cylinder portions 13, an injector 18 serving as a fuel supply device injecting fuel (for example, heavy oil and natural gas) is provided. A fuel tank (not illustrated) is interlocked with each of the injectors 18.

The exhaust turbine turbocharger 12 has a configuration in which the compressor 21 and the turbine 22 are coaxially interlocked with each other via a rotary shaft 23 such that the compressor 21 and the turbine 22 can integrally rotate due to the rotary shaft 23. An intake pipe 13 for taking air in from the outside is interlocked with the compressor 21, and the intake pipe L1 leading to the intake manifold 15 is interlocked with the compressor 21. The exhaust pipe 12 leading to the exhaust manifold 17 is interlocked with the turbine 22, and an exhaust pipe L4 for exhausting air to the outside is interlocked with the turbine 22.

Therefore, the turbine 22 is driven by flue gas (combustion gas) which has been introduced from the exhaust manifold 17 through the exhaust pipe 12, and then, the turbine 22 drives the compressor 21. Thereafter, the flue gas is discharged to the outside through the exhaust pipe 14. Meanwhile, the compressor 21 is driven by the turbine 22, and then, the compressor 21 compresses gas such as air taken in through the intake pipe 13. Thereafter, the gas such as compressed air is pressure-fed to the intake manifold 15 through the intake pipe L1, as the combustion gas.

In addition, the diesel engine main body 11 is provided with an engine rotation starter device 24 which can start the engine without injecting any fuel into the cylinder portions 13. For example, the engine rotation starter device 24 is a device which operates the pistons (not illustrated) of the cylinder portions 13 by supplying operation gas to the cylinder portions 3. The engine rotation starter device 24 includes an operation gas supply source 25 (for example, an accumulator or a pump), opening-closing valves 26, and an operation gas supply pipe 15. The operation gas supply source 25 is interlocked with the base end portion of the operation gas supply pipe L5, and the tip end portion thereof is interlocked with each of the cylinder portions 13. The operation gas supply pipe 15 is provided with a plurality the opening-closing valves 26 respectively corresponding to the cylinder portions. When the marine diesel engine 10 starts, the engine rotation starter device 24 controls opening and closing the opening-closing valves 26, thereby repeating the supply and the supply-stop of the operation gas of the operation gas supply source 25 with respect to the cylinder portions 13 through the operation gas supply pipe 15. Accordingly, without injecting any fuel into the cylinder portions 13, it is possible to operate the pistons (not illustrated) respectively provided in the cylinder portions 13 and to start rotating (start driving) the crankshaft via the crosshead.

The exhaust turbine turbocharger 12 is a hybrid turbocharger, and an electric motor generator (electric motor) 32 is interlocked with the exhaust turbine turbocharger 12 via a rotary shaft 31 which is coaxially interlocked with the rotary shaft 23 of the compressor 21 and the turbine 22. The electric motor generator 32 is configured with a rotor (not illustrated) which is fixed to the rotary shaft 31, and a stator (not illustrated) which is fixed to a casing and is disposed around the rotor. The electric motor generator 32 has a power generation function of generating power when being driven by the flue gas. The electric motor generator 32 also has an electrically-powered function of rotatively driving the compressor 21 and the turbine 22.

The exhaust turbine turbocharger 12 includes a power conversion device 33. The power conversion device includes a first power conversion unit 31, a power storage unit 35, and a second power conversion unit 36. The first power conversion unit 34 connected to the electric motor generator 32. When a regenerative operation of the electric motor generator 32 is performed, first power conversion unit 34 converts AC power generated by the electric motor generator 32 into DC power and outputs the DC power. The second power conversion unit 36 connected to an inboard power system 37. When the regenerative operation of the electric motor generator 32 is performed, the second power conversion unit 36 converts the DC power from the first power conversion unit 34 into three-phase AC power suitable for the inboard power system and outputs the three-phase AC power to the inboard power system 37. The power storage unit 35 is connected to a location between the first power conversion unit 34 and the second power conversion unit 36 and stores the DC power from the first power conversion unit 34 as much as a predetermined amount. The power storage unit 35 is provided for smoothing power which is output to the second power conversion unit 36. When a regenerative operation of the electric motor generator 32 starts, the power storage unit 35 outputs the stored power to the second power conversion unit 36. After the regenerative operation starts, the power output to the second power conversion unit 36 is output from the electric motor generator 32 via the first power conversion unit 34.

In addition, when a power running operation of the electric motor generator 32 is performed, the second power conversion unit 36 converts three-phase AC power from the inboard power system 37 into DC power and outputs the DC power to the first power conversion unit 34. When the power running operation of the electric motor generator 32 is performed, the first power conversion unit 34 converts the DC power from the second power conversion unit 36 into AC power and outputs the AC power to the electric motor generator 32. The power storage unit 35 stores the DC power from the second power conversion unit 36 as much as a predetermined amount. The power storage unit 35 is provided for smoothing power which is output to the first power conversion unit 34. When a power running operation of the electric motor generator 32 starts, the power output to the power storage unit 35 outputs the stored power to the first power conversion unit 34. After the power running operation starts, the power output to the first power conversion unit 34 is output from the inboard power system 37 via the second power conversion unit 36.

Here, the configuration of the power conversion device 33 will not be described in detail. However, for example, the first power conversion unit 34 is a converter, the power storage unit 35 is a capacitor, and the second power conversion unit 36 is an inverter.

A control device 36 includes a first control device 38a controlling the electric motor generator 32, and a second control device 38b controlling the diesel engine main body 11.

The first control device 36a controls the first power conversion unit 34 and the second power conversion unit 36, thereby being able to control the electric motor generator 32. In other words, the first control device 38a controls the functions of the first power conversion unit 34 and the second power conversion unit 36 in accordance with a drive state (regenerative operation state or power running operation state) of the electric motor generator 32.

The second control device 38b can control driving the injectors (fuel supply devices) 18 and the engine rotation starter device 24 in the diesel engine main body 11. In addition, the second control device 38b controls driving each of the injectors 18 and controls the fuel injection time and the fuel injection amount. Moreover, the second control device 38b controls opening and closing the opening-closing valves 26 configuring the engine rotation starter device 24 and controls the operation gas supply time and the operation gas supply amount with respect to the cylinder portions 13.

In addition, in the first embodiment, when an engine rotation activation start signal (internal combustion engine rotation activation start signal) 102 is input and the turbine rotational frequency (turbine rotational frequency is equal to "compressor rotational frequency" and "turbocharger rotational frequency") reaches an engine rotation-activation-starting rotational frequency (internal combustion engine rotation-activation-starting rotational frequency) set in advance, the control device 38 releases the opening-closing valves 26 and starts air running for supplying the operation gas to the diesel engine main body 11. When the rotational frequency of the marine diesel engine 10 reaches a fuel-supply-starting rotational frequency set in advance, the control device 38 drives each of the injectors 18 and starts supplying fuel to the diesel engine main body 11.

Specifically, when the motoring start preparation signal 101 is input, the control device 38 controls the second power conversion unit 36 such that the three-phase AC power from the inboard power system 37 is converted into DC power, the DC power is stored in the power storage unit 35, and the voltage of the power storage unit 35 is caused to reach a standby voltage set in advance. In addition, when the voltage of the power storage unit 35 reaches the standby voltage, the control device 38 controls the first power conversion unit 34 such that the DC power of the power storage unit 35 is converted into AC power and driving the electric motor generator 32 starts. Thereafter, power from the inboard power system 37 is output to the electric motor generator 32 such that the turbine rotational frequency is caused to reach the engine rotation-activation-starting rotational frequency set in advance. Thereafter, the turbine rotational frequency is maintained. When the engine rotation activation start signal 102 is input, the control device 38 controls opening and closing each of the opening-closing valves 26 and starts the air running in which the supply and the supply-stop of the operation gas with respect to the diesel engine main body 11 are repeated, thereby raising the engine rotational frequency. When the engine rotational frequency reaches the fuel-supply-starting rotational frequency set in advance, the control device 38 drives each of the injectors 18 and supplies fuel to the diesel engine main body 11. Then, the marine diesel engine 10 starts an operation due to combustion.

A motoring start preparation signal 101 and the engine rotation activation start signal 102 are output when an inboard person-in-charge operates an operation panel (not illustrated). There are provided a switch for transmitting the motoring start preparation signal 101 and a switch for transmitting the engine rotation activation start signal 102.

Figure 2:
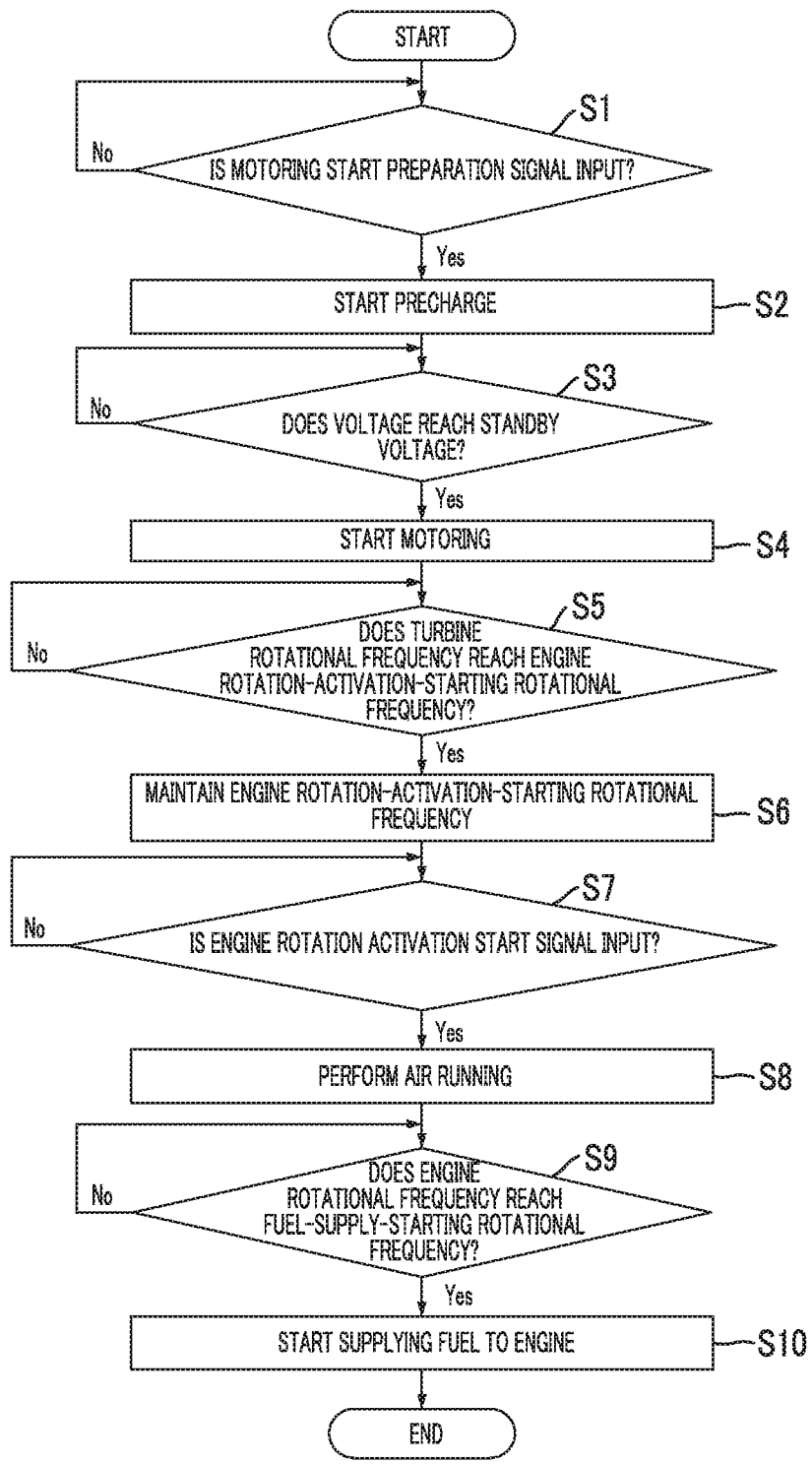
FIG. 2 is a flow chart illustrating a method for starting an internal combustion engine of the first embodiment.
Figure 3:
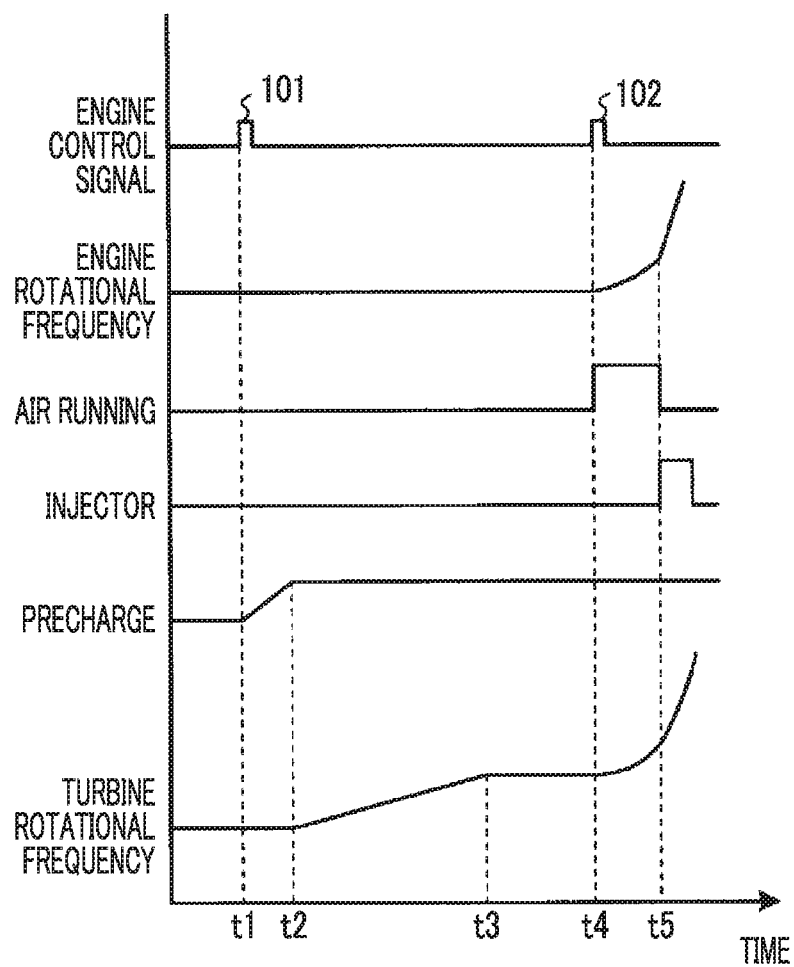
FIG. 3 is a time flow chart illustrating the method for starting an internal combustion engine.

Here, a starting method using the device for starting an internal combustion engine of the first embodiment will be described in detail by using a flow chart and a time chart. FIG. 2 flow chart illustrating the method for starting an internal combustion engine of the first embodiment. FIG. 3 is a time flow chart illustrating the method for starting an internal combustion engine.

In the method for starting an internal combustion engine of the first embodiment, as illustrated in FIG. 2, in Step S1, the control device 38 determines whether or not the motoring start preparation signal 101 is input. Here, when it is determined that the motoring start preparation signal 101 is not input (No), the control device 38 stands by without any change. Meanwhile, when it is determined that the motoring start preparation signal 101 is input (Yes), in Step S2, the control device 38 controls the second power conversion unit 36 such that the three-phase AC power from the inboard power system 37 is converted into DC power and the DC power is stored in the power storage unit 35, that is, precharge starts. In Step S3, the control device 38 detects a DC bus voltage of the power storage unit and the control device 38 determines whether or not the DC bus voltage of the power storage unit 35 reaches a value equal to or greater than a specified value, that is, the aforementioned standby voltage.

Here, when it is determined that the DC bus voltage of the power storage unit 35 does not reach the standby voltage (No), the control device 38 continues the precharge. Meanwhile, when it is determined that the DC bus voltage of the power storage unit 35 reaches the standby voltage (Yes), in Step S4, the control device 38 controls the first power conversion unit 34 such that the DC power of the power storage unit 35 is converted into AC power, driving the electric motor generator 32 starts, and the control device 38 outputs power from the inboard power system 37 to the electric motor generator 32, thereby starting the motoring. In other words, by using the electric motor generator 32, the compressor 21 and the turbine 22 of the exhaust turbine turbocharger 12 are rotatively driven, and the turbine rotational frequency is raised. In Step S5, the control device 38 determines whether or not the motoring is stable and the turbine rotational frequency (compressor rotational frequency) reaches the engine rotation-activation-starting rotational frequency.

When it is determined that the turbine rotational frequency does not reach the engine rotation-activation-starting rotational frequency (No), the turbine rotational frequency is further raised. When it is determined that the turbine rotational frequency reaches the engine rotation-activation-starting rotational frequency (Yes), in Step S6, the turbine rotational frequency stops being raised, and the rotational frequency is maintained. Here, the control device 38 waits an input of the engine rotation activation start signal 102. In this case, the control device 38 maintains the DC bus voltage of the power storage unit 35 at the standby voltage (for example, 600 V) and maintains the turbine rotational frequency at the engine rotation-activation-starting rotational frequency (for example, 500 rpm).

Thereafter, in Step S7, the control device 8 determines whether or not the engine rotation activation start signal 102 is input. Here, when it is determined that the engine rotation activation start signal 102 is not input (No), the standby state is maintained. Meanwhile, when it is determined that the engine rotation activation start signal 102 is input (Yes), in Step S8, the control device 38 controls opening and closing the opening-closing valves 26 and supplies the operation gas to the diesel engine main body 11 so as to execute the air running, thereby raising the engine rotational frequency. In the air running, the supply and the supply-stop of the operation gas with respect to the insides of the cylinder portions 13 of the diesel engine main body 11 are repeated such that the pistons reciprocate and the crankshaft rotates via the crosshead. Thereafter, when the rotational frequency of the crankshaft becomes a predetermined rotational frequency or greater, an exhaust valve (not illustrated) starts an opening-closing operation.

In Step S9, the control device 38 determines whether or not the engine rotational frequency reaches the fuel-supply-starting rotational frequency (for example, 5 rpm). Here, when it is determined that the engine rotational frequency does not reach the fuel-supply-starting rotational frequency (No), the control device 38 continues the air running. Meanwhile, when it is determined that the engine rotational frequency reaches the fuel-supply-starting rotational frequency (Yes), in Step S9, the control device 38 drives each of the injectors 18, and fuel is injected into the cylinder portions 13 (combustion chamber) of the diesel engine main body 11. Then, in the marine diesel engine 10, fuel inside the cylinder portions (combustion chamber) is ignited and combustion starts. Accordingly, it is possible to start a combustion operation.

In addition, the operation timing of the device for starting an internal combustion engine of the first embodiment will be described. As illustrated in FIGS. 1 and 3, at a time t1, when the motoring start preparation signal 101 output, the second power conversion unit 36 converts the three-phase AC power from the inboard power system 37 into DC power and stores the DC power in the power storage unit 35. Accordingly, the precharge starts and the DC bus voltage of the power storage unit 35 rises. At a time t2, when the DC bus voltage of the power storage unit 35 becomes the standby voltage, the DC bus voltage of the power storage unit 35 is maintained at the standby voltage. In addition, here, the first power conversion unit 34 converts the DC power of the power storage unit 35 into AC power, driving the electric motor generator 32 starts, and power from the inboard power system 37 output to the electric motor generator 32. Accordingly, the turbine rotational frequency rises. At a time t3, when the turbine rotational frequency reaches the engine rotation-activation-starting rotational frequency, the turbine rotational frequency is maintained at the engine rotation-activation-starting rotational frequency.

In a state where the DC bus voltage of the power storage unit 35 is maintained at the standby voltage and the turbine rotational frequency is maintained at the engine rotation-activation-starting rotational frequency, the control device 39 waits an input of the engine rotation activation start signal 102. At a time t4, when the engine rotation activation start signal 102 is input, the air running of repeating the release and the release-stop of the opening-closing valves 26 executed. Accordingly, the engine rotational frequency rises. In this case, since the turbine 22 rotates when the operation gas supplied to the cylinder portions 13 through the air running and the combustion gas pressure-fed by the compressor 21 are discharged, the turbine rotational frequency also rises. At a time t5, when the engine rotational frequency reaches the fuel-supply-starting rotational frequency, the injectors 18 are driven and fuel is injected into the cylinder portions 13. Then, the marine diesel engine 10 starts combustion inside the cylinder portions 13 (combustion chambers) and the engine rotational frequency rises to a specified rotational frequency, thereby starting the combustion operation.

As described above, in the device for starting an internal combustion engine of the first embodiment, there are provided the exhaust turbine turbocharger 12, the electric motor generator 32, the power storage unit 35, the engine rotation starter device 24 (operation gas supply pipe L5, operation gas supply source 25, and opening-closing valves 26), the fuel supply device (injectors 18), and the control device 38 that controls the electric motor generator 32, the engine rotation starter device 24, and the injectors 18. When the engine rotation activation start signal 102 is input and the turbine rotational frequency reaches the engine rotation-activation-starting rotational frequency, the control device 38 drives the engine rotation starter device 24, and when the engine rotational frequency reaches the fuel-supply-starting rotational frequency, the control device 38 drives the injectors 18.

Accordingly, when the engine rotation activation start signal 102 is input and the turbine rotational frequency reaches the engine rotation-activation-starting rotational frequency, the diesel engine main body 11 is driven without supplying any fuel. When the engine rotational frequency reaches the fuel-supply-starting rotational frequency, the injectors 18 are driven such that the marine diesel engine 10 starts the combustion operation. Therefore, without using any additional device such as an auxiliary blower, the marine diesel engine 10 starts by using the electric motor generator 32 for driving the exhaust turbine turbocharger 12. Thus, while the equipment cost is restrained from increasing, it is possible to improve the starting performance of the marine diesel engine 10.

In the device for starting an internal combustion engine of the first embodiment, when the motoring start preparation signal 101 input, storing power in the power storage unit 35 starts and the standby voltage is maintained. When the engine rotation activation start signal 102 is input and the turbine rotational frequency reaches the engine rotation-activation-starting rotational frequency, the engine rotation starter device 24 is driven. Accordingly, when the motoring start preparation signal 101 is input, power for driving the exhaust turbine turbocharger 12 is stored in the power storage unit 35 and the control device 38 stands by while maintaining the standby voltage. Accordingly, when the engine rotation activation start signal 102 is input, it is possible to appropriately raise the turbine rotational frequency and the engine rotational frequency and to execute a smooth start of the marine diesel engine 10.

In the device for starting an internal combustion engine of the first embodiment, when the voltage of the power storage unit 35 reaches the standby voltage, driving the electric motor generator 32 starts by power of the power storage unit 35, power from the inboard power system 37 is output to the electric motor generator 32, and the turbine rotational frequency is maintained at the engine rotation-activation-starting rotational frequency. When the engine rotation activation start signal 102 is input, the engine rotation starter device 24 driven. Accordingly, in a state where power for driving the exhaust turbine turbocharger 12 is stored in the power storage unit 35 and the turbine rotational frequency is maintained at the engine rotation-activation-starting rotational frequency, the control device 38 in a standby state with respect to the engine rotation activation start signal 102. Thus, when the engine rotation activation start signal 102 input, it is possible to raise the turbine rotational frequency and the engine rotational frequency at an early stage, and it is possible to execute a smooth start of the marine diesel engine 10.

In addition, the method for starting an internal combustion engine of the first embodiment includes a step of starting storing power in the power storage unit 35 upon a reception of the motoring start preparation signal 101, a step of driving the exhaust turbine turbocharger 12 by driving the electric motor generator 32 by power of the power storage unit 35 when the voltage of the power storage unit 35 reaches the standby voltage, a step of maintaining the voltage of the power storage unit 35 at the standby voltage and maintaining the turbine rotational frequency at the engine rotation-activation-starting rotational frequency, a step of starting rotation-activation of the diesel engine main body 11 upon a reception of the engine rotation activation start signal 102 without supplying any fuel, and a step of supplying fuel to the cylinder portions 13 when the engine rotational frequency reaches the fuel-supply-starting rotational frequency.

Accordingly, when the engine rotation activation start signal 102 is input, it is possible to raise the turbine rotational frequency and the engine rotational frequency at an early stage, and it is possible to execute a smooth start of the marine diesel engine 10.

Second Embodiment

Figure 5:
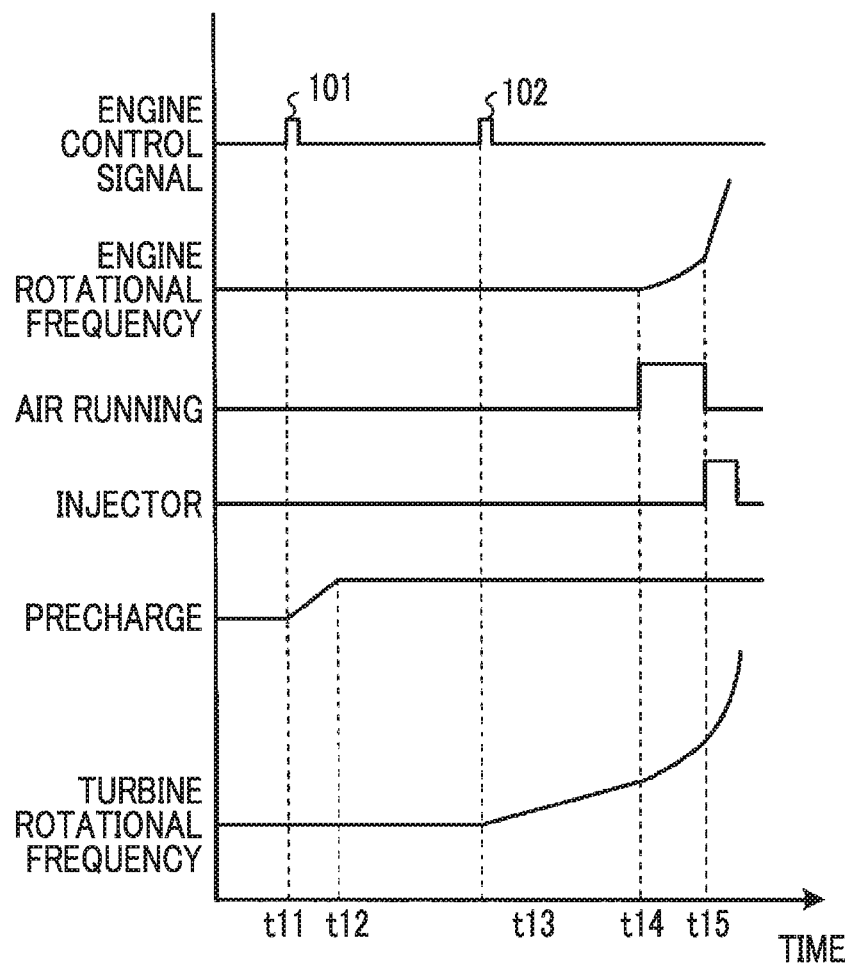
FIG. 5 is a time flow chart illustrating the method for starting an internal combustion engine.

FIG. 1 is a flow chart illustrating a method for starting an internal combustion engine of a second embodiment. FIG. 5 is a time flow chart illustrating the method for starting an internal combustion engine. The basic configuration of the device for starting an internal combustion engine of the present embodiment a configuration similar to that of the first embodiment described above. Description will be given with reference to FIG. 1. The same reference sign will be applied to a member having a function similar to that of the first embodiment described above, and detailed description thereof will be omitted.

In the device for starting an internal combustion engine of the second embodiment, as illustrated in FIG. 1, when the motoring start preparation signal 101 is input, the control device 38 controls the second power conversion unit 36 such that the three-phase AC power from the inboard power system 37 is converted into DC power, the DC power is stored in the power storage unit 35, and the voltage of the power storage unit 35 is caused to reach a standby voltage set in advance. Thereafter, the voltage of the power storage unit 35 is maintained. When the engine rotation activation start signal 102 is input, the control device 38 controls the first power conversion unit 34 such that the DC power of the power storage unit 35 is converted into AC power, driving the electric motor generator 32 starts, and power from the inboard power system 37 is output to the electric motor generator 32, thereby raising the turbine rotational frequency. When the turbine rotational frequency reaches the engine rotation-activation-starting rotational frequency, the release and the release-stop of the opening-closing valves 26 are repeated and the operation gas is supplied to the diesel engine main body 11, thereby starting the air running. Accordingly, the engine rotational frequency is raised. When the engine rotational frequency reaches the fuel-supply-starting rotational frequency, the control device 38 drives each of the injectors 18 and supplies fuel to the diesel engine main body 11. Then, the marine diesel engine 10 starts the combustion operation.

Here, starting method using the device for starting an internal combustion engine of the second embodiment will be described in detail by using a flow chart and a time chart.

Figure 4:
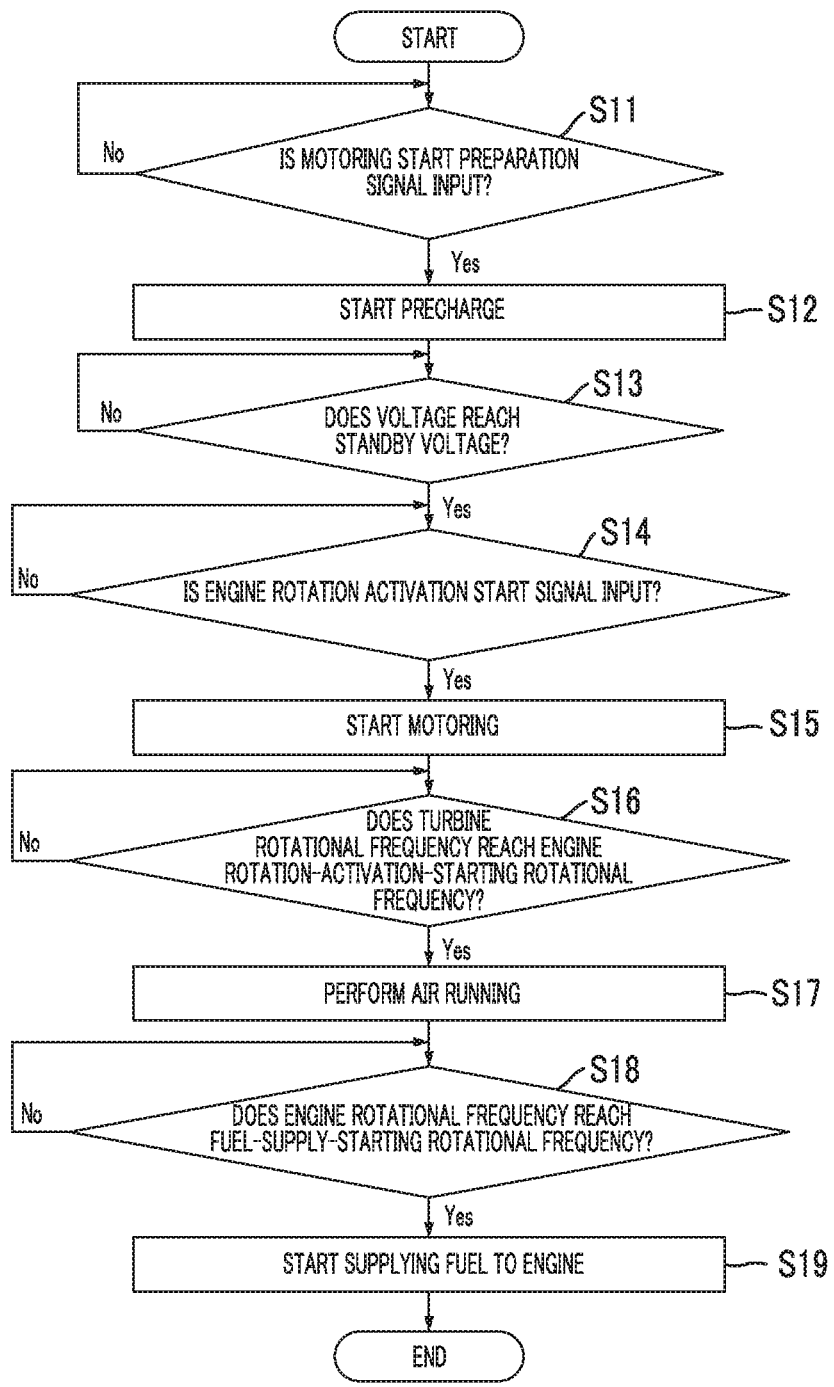
FIG. 4 is a flow chart illustrating a method for starting an internal combustion engine a second embodiment.

In the method for starting an internal combustion engine of the second embodiment, as illustrated in FIGS. 1 and 4. In Step S11, the control device 38 determines whether or not the motoring start preparation signal 101 is input. Here, when it is determined that the motoring start preparation signal 101 is not input (No), the control device 38 stands by without any change. Meanwhile, when it is determined that the motoring start preparation signal 101 is input (Yes), in Step S12, the control device 38 controls the second power conversion unit 36 such that the three-phase AC power from the inboard power system 37 is converted into DC power and the DC power is stored in the power storage unit 35, that is, the precharge starts.

In Step S13, the control device 38 detects the DC bus voltage of the power storage unit 35, and the control device 38 determines whether or not the DC bus voltage of the power storage unit 35 reaches a value equal to or greater than the specified value, that is, the aforementioned standby voltage. Here, when it is determined that the DC bus voltage of the power storage unit 35 does not reach the standby voltage (No), the control device 38 continues the precharge. Meanwhile, when it is determined that the DC bus voltage of the power storage unit 35 reaches the standby voltage (Yes), the DC bus voltage is maintained at the standby voltage. Here, the control device 38 waits an input of the engine rotation activation start signal 102.

In Step S14, the control device 38 determines whether or not the engine rotation activation start signal 102 is input. Here, when it is determined that the engine rotation activation start signal 102 is not input (No), the standby state is maintained. Meanwhile, when it is determined that the engine rotation activation start signal 102 is input (Yes), in Step S15, the control device 38 controls the first power conversion unit 34 such that the DC power of the power storage unit 35 is converted into AC power, driving the electric motor generator 32 starts, and the control device 38 outputs power from the inboard power system 37 to the electric motor generator 32, thereby starting the motoring. In other words, by using the electric motor generator 32, the compressor 21 and the turbine 22 of the exhaust turbine turbocharger 12 are rotatively driven, and the turbine rotational frequency is raised. In Step S16, the control device 38 determines whether or not the motoring is stable and the turbine rotational frequency reaches the engine rotation-activation-starting rotational frequency.

Here, when it is determined that the turbine rotational frequency does not reach the engine rotation-activation-starting rotational frequency (No), the turbine rotational frequency is further raised. When it is determined that the turbine rotational frequency reaches the engine rotation-activation-starting rotational frequency (Yes), in Step S17, the release and the release-stop of the opening-closing valves 26 are repeated and the operation gas is supplied to the diesel engine main body 11 so as to execute the air running, thereby raising the engine rotational frequency.

In Step S18, the control device 38 determines whether or not the engine rotational frequency reaches the fuel-supply-starting rotational frequency. Here, when it is determined that the engine rotational frequency does not reach the fuel-supply-starting rotational frequency (No), the control device 38 continues the air running. Meanwhile, when it determined that the engine rotational frequency reaches the fuel-supply-starting rotational frequency (Yes), in Step S19, the control device 38 drives each of the injectors 18, and fuel is injected into the cylinder portions 13 (combustion chamber) of the diesel engine main body 11. Then, in the marine diesel engine 10, fuel inside the cylinder portions (combustion chamber) is ignited and combustion starts. Accordingly, it is possible to start a combustion operation.

In addition, the operation timing of the device for starting an internal combustion engine of the second embodiment will be described. As illustrated in FIGS. 1 and 5, at a time t11, when the motoring start preparation signal 101 is output, the second power conversion unit 36 converts the three-phase AC power from the inboard power system 37 into DC power and stores the DC power in the power storage unit 35. Accordingly, the precharge starts and the DC bus voltage of the power storage unit 35 rises. At a time t12, when the DC bus voltage of the power storage unit 35 becomes the standby voltage, the DC bus voltage of the power storage unit 35 is maintained at the standby voltage. In a state where the DC bus voltage of the power storage unit 35 is maintained at the standby voltage, the control device 38 waits an input of the engine rotation activation start signal 102.

At a time t13, when the engine rotation activation start signal 102 is input, the first power conversion unit 34 converts the DC power of the power storage unit 35 into AC power, driving the electric motor generator 32 starts, and power from the inboard power system 37 is output to the electric motor generator 32. Accordingly, the turbine rotational frequency of the exhaust turbine turbocharger rises. At a time t14, when the turbine rotational frequency reaches the engine rotation-activation-starting rotational frequency, the release and the release-stop of the opening-closing valves 26 are repeated and the air running is executed, thereby raising the engine rotational frequency. In this case, since the turbine 22 rotates when the operation gas supplied to the cylinder portions through the air running and the combustion gas pressure-fed by the compressor 21 are discharged, the turbine rotational frequency also rises. At a time t15, when the engine rotational frequency reaches the fuel-supply-starting rotational frequency, the injectors 18 are driven and fuel is injected into the cylinder portions 13. Then, the marine diesel engine 10 starts the combustion operation inside the cylinder portions 13 (combustion chambers).

As described above, in the device for starting an internal combustion engine of the second embodiment, when the motoring start preparation signal 101 is input, the control device 38 converts the three-phase AC power from the inboard power system 37 into DC power, stores the DC power in the power storage unit 35, and maintains the standby voltage. When the engine rotation activation start signal 102 is input, the DC power of the power storage unit 35 is converted into AC power such that driving the electric motor generator 32 starts, power from the inboard power system 37 is output to the electric motor generator 32, and the turbine rotational frequency is raised. When the turbine rotational frequency reaches the engine rotation-activation-starting rotational frequency, the opening-closing valves 26 is released and the operation gas is supplied to the cylinder portions 13. Accordingly, the engine rotational frequency is raised. When the engine rotational frequency reaches the fuel-supply-starting rotational frequency, the control device 38 drives each of the injectors 18 and supplies fuel to the cylinder portions 13.

Accordingly, in a state where power for driving the exhaust turbine turbocharger 12 is stored in the power storage unit 35, the control device 38 is in a standby state with respect to the engine rotation activation start signal 102. Therefore, when the engine rotation activation start signal 102 is input, driving the electric motor generator 32 starts by power of the power storage unit 35, power from the inboard power system 37 is output to the electric motor generator 32, and the turbine rotational frequency is raised. Accordingly, there is no need to supply more power to the power storage unit 35 than is necessary. Thus, without consuming any power of the power storage unit 35 in the standby state, it is possible to reduce the power consumption amount.

In addition, the method for starting an internal combustion engine of the second embodiment includes a step of starting storing power in the power storage unit 35 upon a reception of the motoring start preparation signal 101, a step of maintaining the voltage of the power storage unit 35 at the standby voltage, a step of driving the exhaust turbine turbocharger 12 by driving the electric motor generator 32 by power of the power storage unit 35 upon a reception of the engine rotation activation start signal 102, a step of starting rotation-activation of the diesel engine main body 11 when the turbine rotational frequency reaches the engine rotation-activation-starting rotational frequency, and a step of supplying fuel to the cylinder portions 13 when the engine rotational frequency reaches the fuel-supply-starting rotational frequency.

Accordingly, when the engine rotation activation start signal 102 is input, driving the electric motor generator 32 starts by power of the power storage unit 35, power from the inboard power system 37 is output to the electric motor generator 32, and the turbine rotational frequency is raised. Accordingly, there is no need to supply more power to the power storage unit 35 than is necessary. Thus, without consuming any power of the power storage unit 35 in the standby state, it is possible to reduce the power consumption amount.

Third Embodiment

Figure 6:
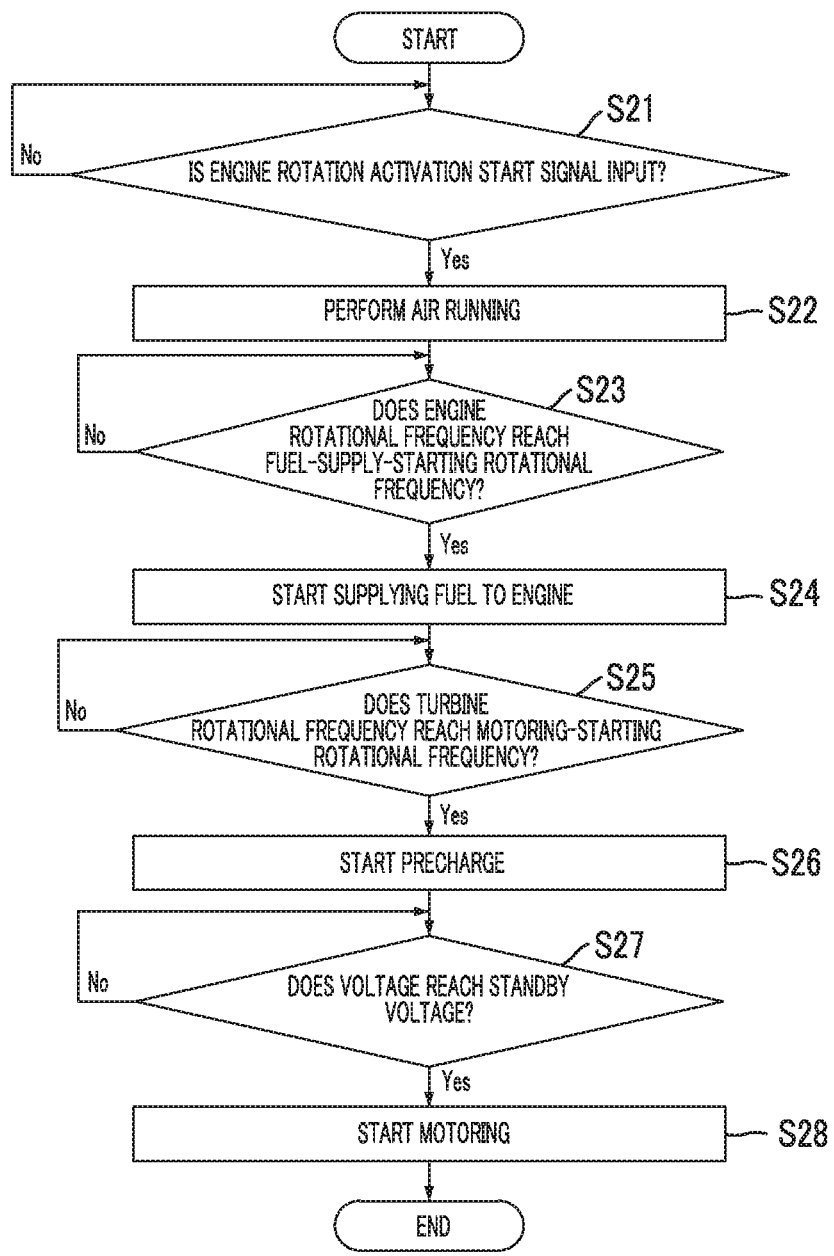
FIG. 6 is a flow chart illustrating a method for starting an internal combustion engine of a third embodiment.
Figure 7:
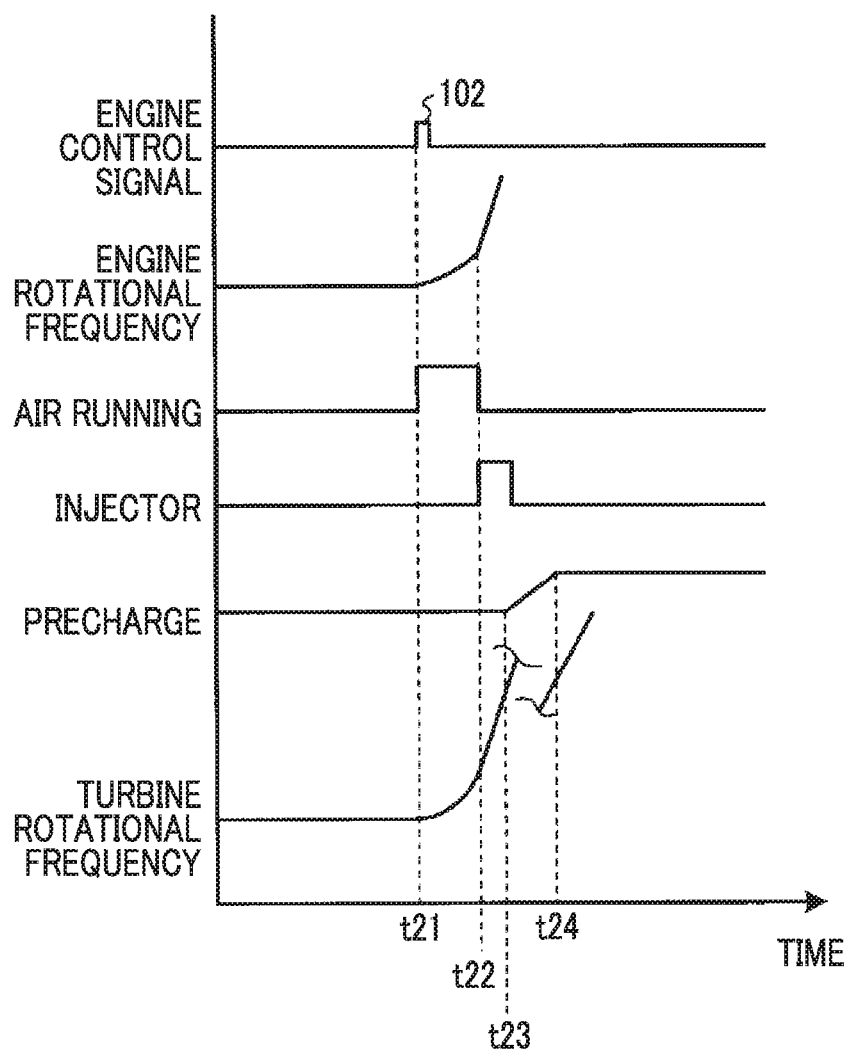
FIG. 7 is a time flow chart illustrating the method for starting an internal combustion engine.

FIG. 6 is a flow chart illustrating a method for starting an internal combustion engine of a third embodiment. FIG. 7 is a time flow chart illustrating the method for starting an internal combustion engine. The basic configuration of the device for starting an internal combustion engine of the present embodiment is a configuration similar to that of the first embodiment described above. Description will be given with reference to FIG. 1. The same reference sign will be applied to a member having a function similar to that of the first embodiment described above, and detailed description thereof will be omitted.

In the device for starting an internal combustion engine of the third embodiment, as illustrated in FIG. 1, when the engine rotation activation start signal 102 is input, the control device 38 repeats the release and the release-stop of the opening-closing valves 26 and supplies the operation gas to the diesel engine main body 11, thereby starting the air running. Accordingly, the engine rotational frequency is raised, and the turbine rotational frequency is raised. When the engine rotational frequency reaches the fuel-supply-starting rotational frequency, the control device 38 drives each of the injectors 18 and supplies fuel to the cylinder portions 13. When the turbine rotational frequency reaches a motoring starting rotational frequency, the control device 38 controls the second power conversion unit 36 such that the three-phase AC power from the inboard power system 37 is converted into DC power and the DC power stored in the power storage unit 35. When the voltage of the power storage unit 35 reaches the standby voltage, the control device 38 controls the first power conversion unit 34 such that the DC power of the power storage unit 35 is converted into AC power and driving the electric motor generator 32 starts (catch-spin). Accordingly, power from the inboard power system 37 is output to the electric motor generator 32, and the turbine rotational frequency is raised. Then, the marine diesel engine 10 starts.

Here, a starting method using the device for starting an internal combustion engine of the third embodiment will be described in detail by using a flow chart and a time chart.

In the method for starting an internal combustion engine of the third embodiment, as illustrated in FIGS. 1 and 6, in Step S21, the control device 38 determines whether or not the engine rotation activation start signal 102 is input. Here, when it is determined that the engine rotation activation start signal 102 is not input (No), the control device 38 stands by without any change. Meanwhile, when it is determined that the engine rotation activation start signal 102 is input (Yes), in Step S22, the release and the release-stop of the opening-closing valves 26 are repeated and the operation gas is supplied to the diesel engine main body 11 so as to execute the air running, thereby raising the engine rotational frequency.

In Step S23, the control device 38 determines whether or not the engine rotational frequency reaches the fuel-supply-starting rotational frequency. Here, when it is determined that the engine rotational frequency does not reach the fuel-supply-starting rotational frequency (No), the control device 38 continues the air running. Meanwhile, when it determined that the engine rotational frequency reaches the fuel-supply-starting rotational frequency (Yes), in Step S24, the control device 38 drives each of the injectors 18, and fuel is injected into the cylinder portions 13 (combustion chamber) of the diesel engine main body 11.

In Step S25, the control device 38 determines whether or not the turbine rotational frequency reaches the motoring starting rotational frequency. Here, when it is determined that the turbine rotational frequency does not reach the motoring starting rotational frequency (for example, 1,000 rpm) (No), the turbine rotational frequency is further raised. When it is determined that the turbine rotational frequency reaches the motoring starting rotational frequency (Yes), in Step S26, the control device 38 controls the second power conversion unit 36 such that the three-phase AC power from the inboard power system 37 is converted into DC power and the DC power is stored in the power storage unit 35, that is, the precharge starts.

In Step S27, the control device 38 detects the DC bus voltage of the power storage unit 35, and the control device 38 determines whether or not the DC bus voltage of the power storage unit 35 reaches a value equal to or greater than the specified value, that is, the standby voltage. Here, when it is determined that the DC bus voltage of the power storage unit 35 does not reach the standby voltage (No), the control device 38 continues the precharge. Meanwhile, when it is determined that the DC bus voltage of the power storage unit 35 reaches the standby voltage (Yes), the DC bus voltage is maintained at the standby voltage. In Step S28, the control device controls the first power conversion unit 34 such that the DC power of the power storage unit 35 is converted into AC power, driving the electric motor generator 32 starts, and the control device 38 outputs power from the inboard power system 37 to the electric motor generator 32, thereby starting the motoring. In other words, by using the electric motor generator 32, the compressor 21 and the turbine 22 of the exhaust turbine turbocharger 12 are rotatively driven, and the turbine rotational frequency is raised. Then, the marine diesel engine 10 can start while the engine rotational frequency rises to the specified rotational frequency.

In addition, the operation timing of the device for starting an internal combustion engine of the third embodiment will be described. As illustrated in FIGS. 1 and 7, at a time t21, when the engine rotation activation start signal 102 is input, the air running is executed by repeating the release and the release-stop of the opening-closing valves 26. Accordingly, the engine rotational frequency rises. At a time t22, when the engine rotational frequency reaches the fuel-supply-starting rotational frequency, the injectors 18 are driven and fuel is injected into the cylinder portions 13 (combustion chambers).

Then, the marine diesel engine 10 starts combustion inside the cylinder portions 13 (combustion chambers), and the engine rotational frequency rises. At a time t23, when the turbine rotational frequency reaches the motoring starting rotational frequency, the second power conversion unit 36 converts the three-phase AC power from the inboard power system 37 into DC power and stores the DC power in the power storage unit 35. Accordingly, the precharge starts and the DC bus voltage of the power storage unit 35 rises. At a time t24, when the DC bus voltage of the power storage unit 35 becomes the standby voltage, the DC bus voltage is maintained at the standby voltage. At the same time, the first power conversion unit 34 converts the DC power of the power storage unit into AC power, driving the electric motor generator 32 starts, and power from the inboard power system 37 is output, to the electric motor generator 32. Accordingly, the motoring starts, and the turbine rotational frequency of the exhaust turbine turbocharger 12 rises. Then, the marine diesel engine 10 starts while the engine rotational frequency rises to the specified rotational frequency.

As described above, in the device for starting an internal combustion engine of the third embodiment, when the engine rotation activation start signal 102 is input, the control device 38 repeats the release and the release-stop of the opening-closing valves 26 and supplies the operation gas to the cylinder portions 13, thereby raising the engine rotational frequency. When the engine rotational frequency reaches the fuel-supply-starting rotational frequency, the control device 38 drives each of the injectors 18 and supplies fuel to the cylinder portions 13. When the turbine rotational frequency reaches the motoring starting rotational frequency, the control device 38 converts the three-phase AC power from the inboard power system 37 into DC power, stores the DC power in the power storage unit 35, and converts the DC power of the power storage unit 35 into AC power such that driving the electric motor generator 32 starts. Accordingly, power from the inboard power system 37 is output to the electric motor generator 32, and the turbine rotational frequency is raised.

Accordingly, without using any additional device such as the auxiliary blower, the marine diesel engine 10 starts by using the electric motor generator 32 for driving the exhaust turbine turbocharger 12. Thus, while the equipment cost is restrained from increasing, it is possible to improve the starting performance of the marine diesel engine 10.

In addition, the method for starting an internal combustion engine of the third embodiment includes a step of supplying the operation gas to the cylinder portions 13 upon a reception of the engine rotation activation start signal 102, a step of supplying fuel to the cylinder portions 13 when the engine rotational frequency reaches the fuel-supply-starting rotational frequency, a step of starting storing power in the power storage unit 35 when the turbine rotational frequency reaches the motoring starting rotational frequency, and a step of raising the turbine rotational frequency by driving the electric motor generator 32 by power of the power storage unit 35 when the power storage unit 35 achieves the standby voltage.

Accordingly, the marine diesel engine 10 starts by using the electric motor generator 32 for driving the exhaust turbine turbocharger 12. Thus, while the equipment cost is restrained from increasing, it is possible to improve the starting performance of the marine diesel engine 10.

Fourth Embodiment

Figure 8:
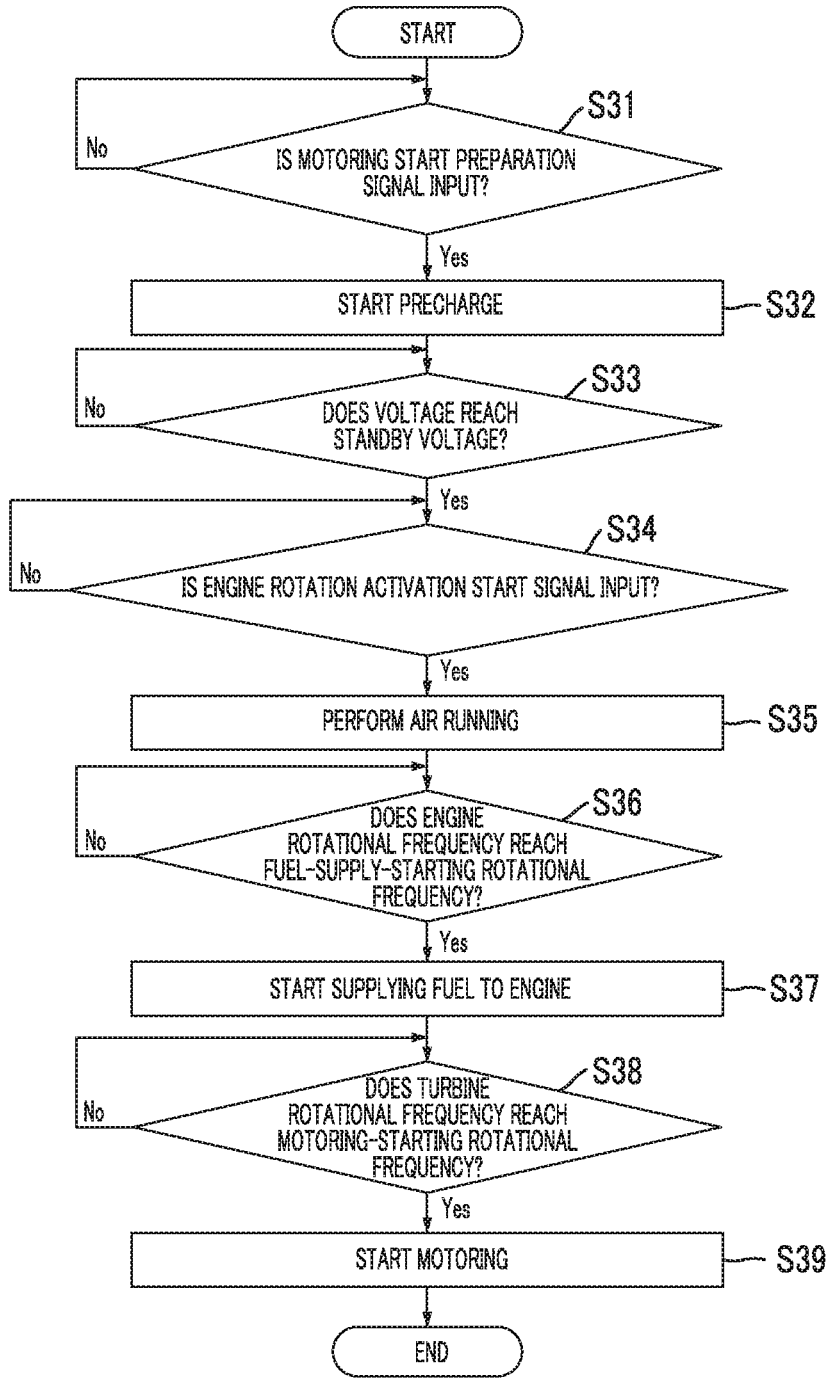
FIG. 8 is a flow chart illustrating a method for starting an internal combustion engine of a fourth embodiment.
Figure 9:
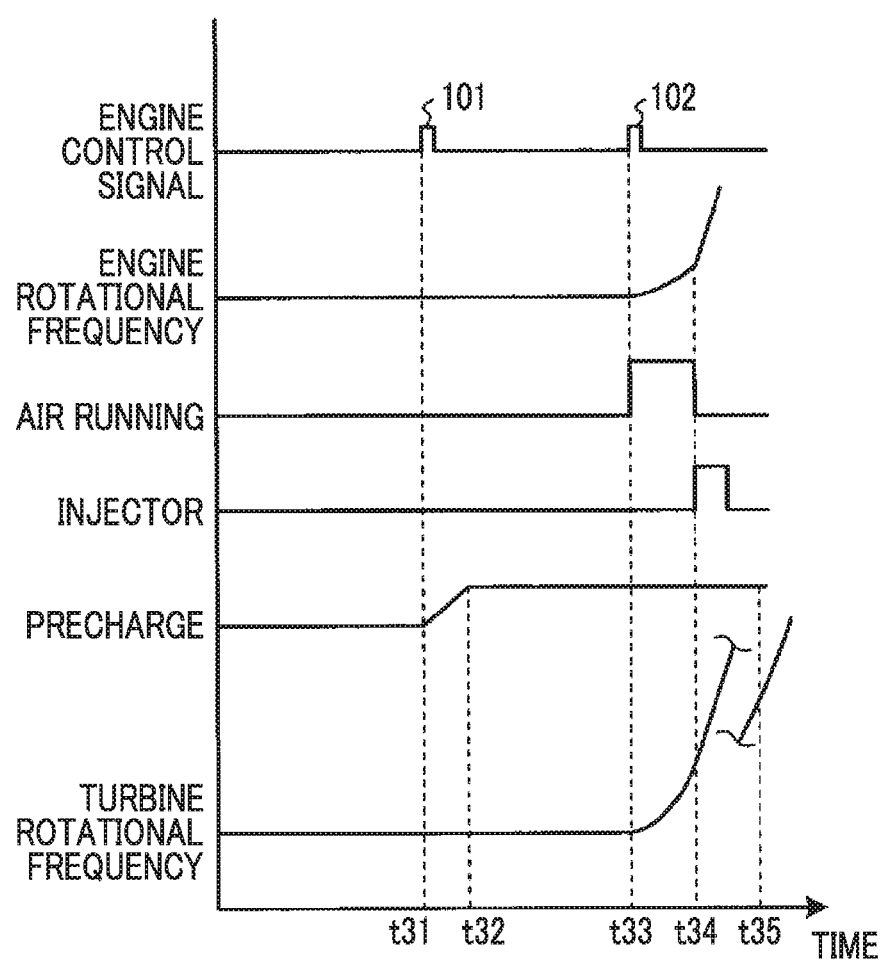
FIG. 9 is a time flow chart illustrating the method for starting an internal combustion engine.

FIG. 8 is a flow chart illustrating a method for starting an internal combustion engine of a fourth embodiment. FIG. 9 is a time flow chart illustrating the method for starting an internal combustion engine. The basic configuration of the device for starting an internal combustion engine of the present embodiment is a configuration similar to that of the first embodiment described above. Description will be given with reference to FIG. 1. The same reference sign will be applied to a member having a function similar to that of the first embodiment described above, and detailed description thereof will be omitted.

In the device for starting an internal combustion engine of the fourth embodiment, as illustrated in FIG. 1, when the motoring start preparation signal 101 is input, the control device 38 controls the second power conversion unit 36 such that the three-phase AC power from the inboard power system 37 is converted into DC power, the DC power is stored in the power storage unit 35, and the standby voltage is maintained. When the engine rotation activation start signal 102 is input, the control device repeats the release and the release-stop of the opening-closing valves 26 and supplies the operation gas to the diesel engine main body 11, thereby starting the air running. Accordingly, the engine rotational frequency is raised, and the turbine rotational frequency is raised. When the engine rotational frequency reaches the fuel-supply-starting rotational frequency, the control device 38 drives each of the injectors 18 and supplies fuel to the cylinder portions 13. When the turbine rotational frequency reaches the motoring starting rotational frequency, the control device 38 controls the first power conversion unit 34 such that the DC power of the power storage unit 35 is converted into AC power and driving the electric motor generator 32 starts (catch-spin). Accordingly, power from the inboard power system 37 is output to the electric motor generator 32, and the turbine rotational frequency is raised. Then, the marine diesel engine 10 starts.

Here, a starting method using the device for starting an internal combustion engine of the fourth embodiment will be described in detail by using a flow chart and a time chart.

In the method for starting an internal combustion engine of the fourth embodiment, as illustrated in FIGS. 1 and 8, in Step S31, the control device 38 determines whether or not the motoring start preparation signal 101 is input. Here, when it is determined that the motoring start preparation signal 101 is not input (No), the control device 38 stands by without any change. Meanwhile, when it is determined that the motoring start preparation signal 101 is input (Yes), in Step S32, the control device 38 controls the second power conversion unit 36 such that the three-phase AC power from the in power system 37 is converted into DC power and the DC power is stored in the power storage unit 35, that is, the precharge starts.

In Step S33, the control device 38 detects the DC bus voltage of the power storage unit 35, and the control device 38 determines whether or not the DC bus voltage of the power storage unit 35 reaches the standby voltage. Here, when it is determined that the DC bus voltage of the power storage unit 35 does not reach the standby voltage (No), the control device 38 continues the precharge. Meanwhile, when it is determined that the DC bus voltage of the power storage unit 35 reaches the standby voltage (Yes), the DC bus voltage is maintained at the standby voltage.

Step S34, the control device 38 determines whether or not the engine rotation activation start signal 102 is input. Here, when it is determined that the engine rotation activation start signal 102 is not input (No), the control device 38 stands by without any change. Meanwhile, when it is determined that the engine rotation activation start signal 102 is input (Yes), in Step S35, the release and the release-stop of the opening-closing valves 26 are repeated and the operation gas is supplied to the diesel engine main body 11 so as to execute the air running, thereby raising the engine rotational frequency.

In Step S36, the control device 38 determines whether or not the engine rotational frequency reaches the fuel-supply-starting rotational frequency. Here, when it is determined that the engine rotational frequency does not reach the fuel-supply-starting rotational frequency (No), the control device 38 continues the air running. Meanwhile, when it is determined that the engine rotational frequency reaches the fuel-supply-starting rotational frequency (Yes), in Step S37, the control device 38 drives each of the injectors 18, and fuel is injected into the cylinder portions 13 (combustion chamber) of the diesel engine main body 11.

Step S38, the control device 38 determines whether or not the turbine rotational frequency reaches the motoring starting rotational frequency. Here, when it is determined that the turbine rotational frequency does not reach the motoring starting rotational frequency (No), the turbine rotational frequency is further raised. When it is determined that the turbine rotational frequency reaches the motoring starting rotational frequency (Yes), in Step S39, the control device 38 controls the first power conversion unit 34 such that the DC power of the power storage unit 35 is converted into AC power, driving the electric motor generator 32 starts, and the control device 38 outputs power from the inboard power system 37 to the electric motor generator 32, thereby starting the motoring. In other words, by using the electric motor generator 32, the compressor 21 and the turbine 22 of the exhaust turbine turbocharger 12 are rotatively driven, and the turbine rotational frequency is raised. Then, the marine diesel engine 10 can start while the engine rotational frequency rises to the specified rotational frequency.

In addition, the operation timing of the device for starting an internal combustion engine of the fourth embodiment will be described. As illustrated in FIGS. 1 and 9, at a time t31, when the motoring start preparation signal 101 is input, the second power conversion unit 36 converts the three-phase AC power from the inboard power system 37 into DC power and stores the DC power in the power storage unit 35. Accordingly, the precharge starts and the DC bus voltage of the power storage unit 35 rises. At a time t32, when the DC bus voltage of the power storage unit 35 becomes the standby voltage, the DC bus voltage is maintained at the standby voltage. At a time t33, when the engine rotation activation start signal 102 is input, the air running is executed by repeating the release and the release-stop of the opening-closing valves 26. Accordingly, the engine rotational frequency rises. At a time t34, when the engine rotational frequency reaches the fuel-supply-starting rotational frequency, the injectors 18 are driven and fuel is injected into the cylinder portions 13 (combustion chambers).

Then, the marine diesel engine 10 starts combustion inside the cylinder portions 13 (combustion chambers), and the engine rotational frequency rises. At a time t35, when the turbine rotational frequency reaches the motoring starting rotational frequency, the first power conversion unit 34 converts the DC power of the power storage unit 35 into AC power, driving the electric motor generator 32 starts, and power from the inboard power system 37 is output to the electric motor generator 32. Accordingly, the motoring starts, and the turbine rotational frequency of the exhaust turbine turbocharger 12 rises. Then, the marine diesel engine 10 starts while the engine rotational frequency rises to the specified rotational frequency.

As described above, in the device for starting an internal combustion engine of the fourth embodiment, when the motoring start preparation signal 101 is input, the control device 38 converts the three-phase AC power from the inboard power system 37 into DC power, stores the DC power in the power storage unit 35, and maintains the standby voltage. When the engine rotation activation start signal 102 is input, the release and the release-stop of the opening-closing valves 26 are repeated and the operation gas is supplied to the cylinder portions 13, thereby raising the engine rotational frequency. When the engine rotational frequency reaches the fuel-supply-starting rotational frequency, the control device drives each of the injectors 18 and supplies fuel to the cylinder portions 13. When the turbine rotational frequency reaches the motoring starting rotational frequency, the control device 38 converts the DC power of the power storage unit 35 into AC power such that driving the electric motor generator 32 starts. Accordingly, power from the inboard power system 37 is output to the electric motor generator 32, and the turbine rotational frequency is raised.

Accordingly, without using any additional device such as the auxiliary blower, the marine diesel engine 10 starts by using the electric motor generator 32 for driving the exhaust turbine turbocharger 12. Thus, while the equipment cost is restrained from increasing, it is possible to improve the starting performance of the marine diesel engine 10.

In addition, the method for starting an internal combustion engine of the fourth embodiment includes a step of starting storing power in the power storage unit 35 upon a reception of the motoring start preparation signal 101, a step of maintaining the DC bus voltage of the power storage unit at the standby voltage, a step of supplying the operation gas to the cylinder portions 13 upon a reception of the engine rotation activation start signal 102, a step of supplying fuel to the cylinder portions 13 when the engine rotational frequency reaches the fuel-supply-starting rotational frequency, and a step of raising the turbine rotational frequency by driving the electric motor generator 32 by power of the power storage unit 35 when the turbine rotational frequency reaches the motoring starting rotational frequency.

Accordingly, the marine diesel engine 10 starts by using the electric motor generator 32 for driving the exhaust turbine turbocharger 12. Thus, while the equipment cost is restrained from increasing, it is possible to improve the starting performance of the marine diesel engine 10.

Fifth Embodiment

Figure 10:
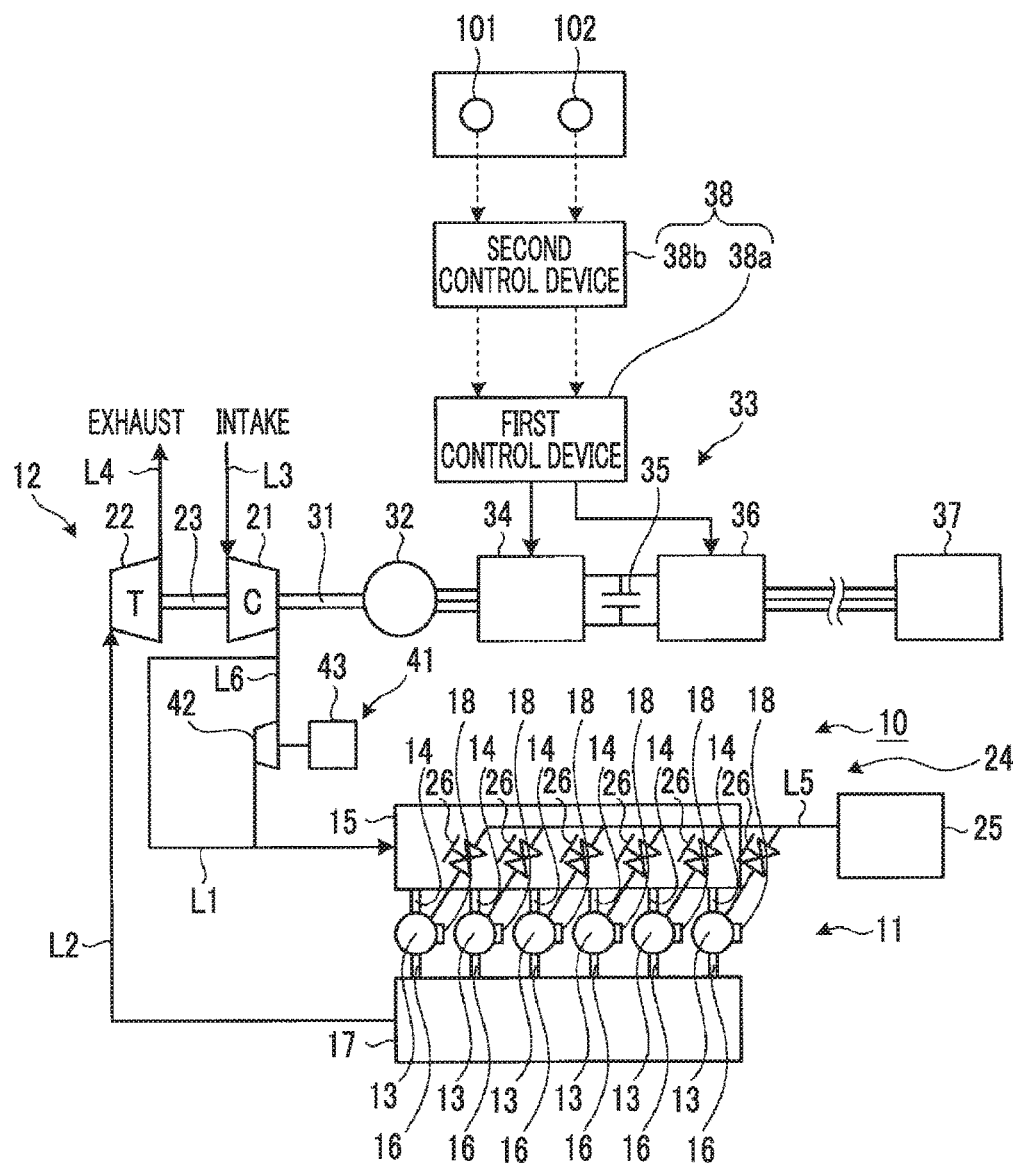
FIG. 10 is a schematic configuration diagram illustrating a device for starting an internal combustion engine of a fifth embodiment.
Figure 11:
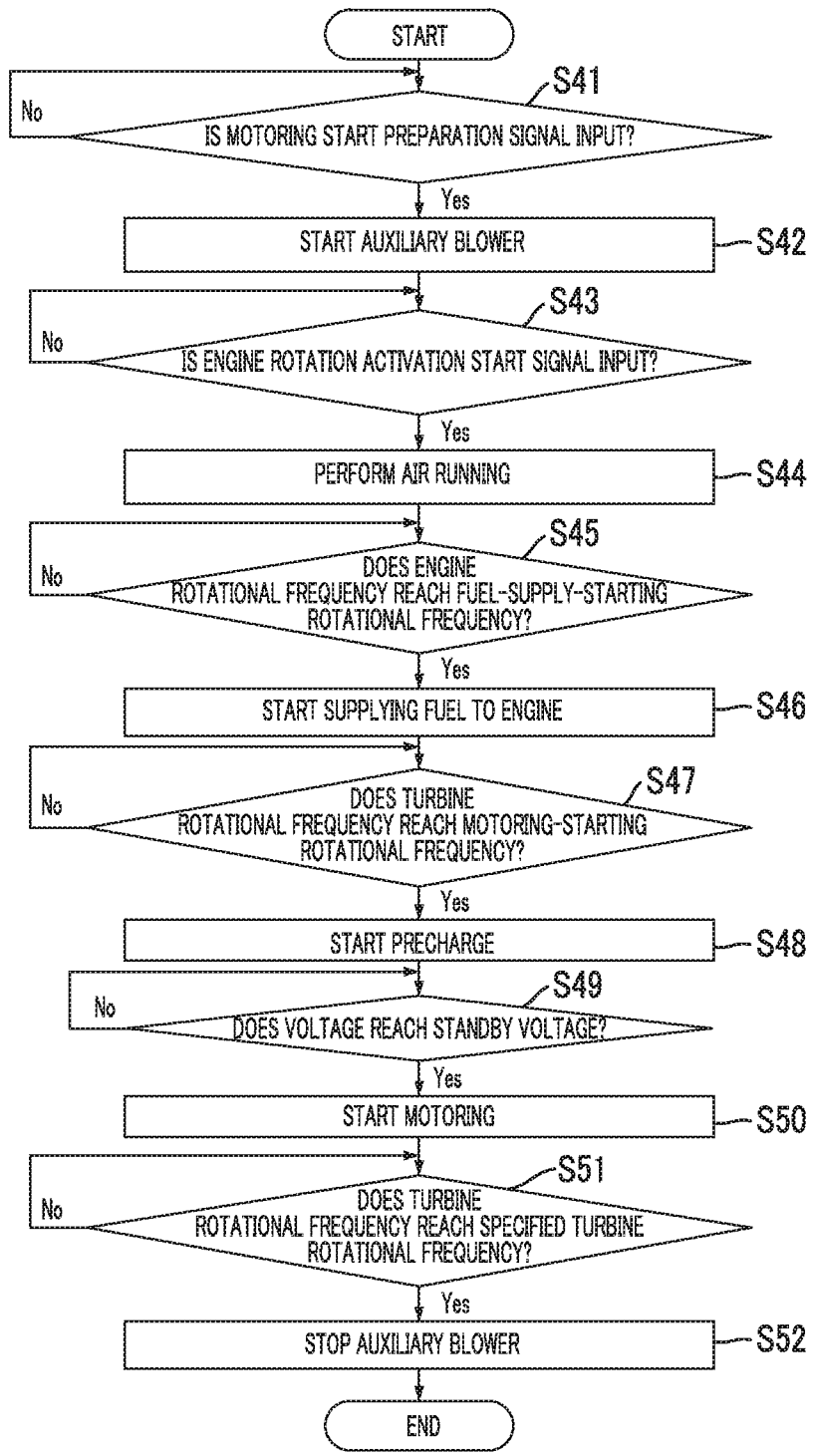
FIG. 11 is a flow chart illustrating a method for starting an internal combustion engine of the fifth embodiment.
Figure 12:
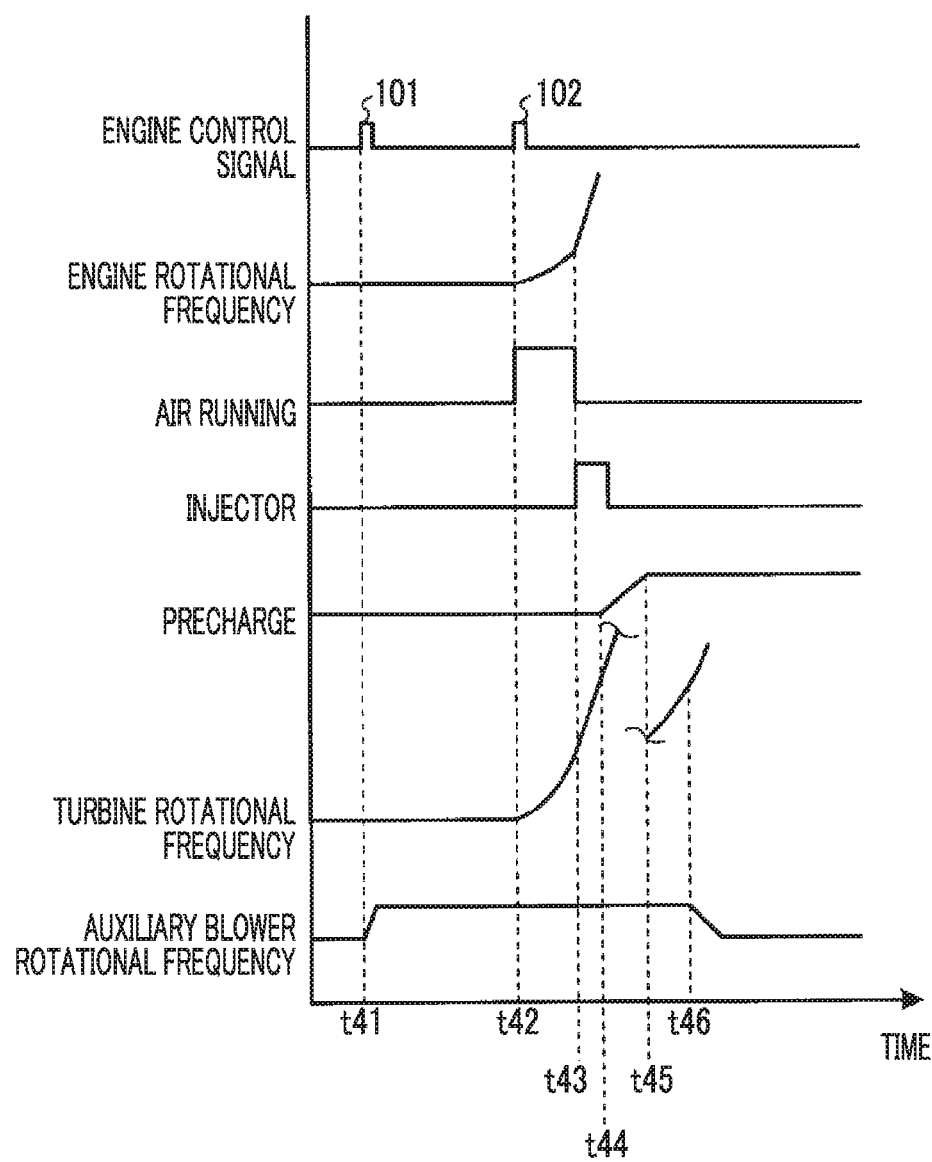
FIG. 12 is a time flow chart illustrating the method for starting an internal combustion engine.

FIG. 10 is a schematic configuration diagram illustrating a device for starting an internal combustion engine of a fifth embodiment. FIG. 11 is a flow chart illustrating a method for starting an internal combustion engine of the fifth embodiment. FIG. 12 is a time flow chart illustrating the method for starting an internal combustion engine. The same reference sign will be applied to a member having a function similar to that of the first embodiment described above, and detailed description thereof will be omitted.

In the fifth embodiment, as illustrated in FIG. 10, a marine diesel engine 10 as the internal combustion engine includes a diesel engine main body 11, an exhaust turbine turbocharger 12, and an auxiliary blower 41. The diesel engine main body 11 is provided with a plurality of cylinder portions 13. Inside each of the cylinder portions 13, a piston (not illustrated) is supported in a freely-reciprocating manner. A lower portion of each piston is interlocked with a crankshaft via a crosshead.

An intake manifold 15 is interlocked with each of the cylinder portions 13 via an intake port 14, and an exhaust manifold 17 interlocked with each of the cylinder portions 13 via an exhaust port 16. The intake manifold 15 is interlocked with a compressor 21 of the exhaust turbine turbocharger 12 via an intake pipe L1. In addition, the exhaust manifold 17 is interlocked with turbine 22 of the exhaust turbine turbocharger 12 via an exhaust pipe 12. In addition, inside each of the cylinder portions 13, an injector 18 serving as a fuel supply device injecting fuel (for example, heavy oil and natural gas) is provided. A fuel tank (not illustrated) is interlocked with each of the injectors 18.

In addition, the diesel engine main body 11 is provided with an engine rotation starter device 24 which can start the engine without injecting any fuel into the cylinder portions 13. For example, the engine rotation starter device 24 is a device which operates the pistons (not illustrated) of the cylinder portions 13 by supplying operation gas to the cylinder portions 13. The engine rotation starter device 24 includes an operation gas supply source 25 (for example, an accumulator or a pump), opening-closing valves 26, and an operation gas supply pipe 15. The operation gas supply source 25 interlocked with the base end portion of the operation gas supply pipe L5, and the tip end portion thereof is interlocked with each of the cylinder portions 13. The operation gas supply pipe 15 is provided with a plurality of the opening-closing valves 26 respectively corresponding to the cylinder portions. When the marine diesel engine 10 starts, the engine rotation starter device 24 controls opening and closing the opening-closing valves 26, thereby repeating the supply and the supply-stop of the operation gas of the operation gas supply source 25 with respect to the cylinder portions 13 through the operation gas supply pipe 15. Accordingly, without injecting any fuel into the cylinder portions 13, it is possible to operate the pistons (not illustrated) respectively provided in the cylinder portions 13 and to start rotating (start driving) the crankshaft via the crosshead.

The exhaust turbine turbocharger 12 has a configuration in which the compressor 21 and the turbine 22 are coaxially interlocked with each other via a rotary shaft 23 such that the compressor 21 and the turbine 22 can integrally rotate due to the rotary shaft 23. An intake pipe 13 for taking air in from the outside is interlocked with the compressor 21, and intake pipe L1 leading to the intake manifold 15 is interlocked with the compressor 21. The exhaust pipe 12 leading to the exhaust manifold 17 is interlocked with the turbine 22, and an exhaust pipe 14 for exhausting air to the outside is interlocked with the turbine 22.

Therefore, the turbine 22 is driven by flue gas (combustion gas) which has been introduced from the exhaust manifold 17 through the exhaust pipe 12, and then, the turbine 22 drives the compressor 21. Thereafter, the flue gas is discharged to the outside through the exhaust pipe 14. Meanwhile, the compressor 21 is driven by the turbine 22, and then, the compressor 21 compresses gas such as air taken in through the intake pipe L3. Thereafter, the gas such as compressed air is pressure-fed to the intake manifold 15 through the intake pipe L1, as the combustion gas.

The exhaust turbine turbocharger 12 is a hybrid turbocharger, and an electric motor generator (electric motor) 32 is interlocked with the exhaust turbine turbocharger 12 via a rotary shaft 31 which is coaxially interlocked with the rotary shaft 23 of the compressor 21 and the turbine 22. The electric motor generator 32 is configured with a rotor (not illustrated) which is fixed to the rotary shaft 31, and a stator (not illustrated) which is fixed to a casing and is disposed around the rotor. The electric motor generator 32 has a power generation function of generating power when being driven by the flue gas. The electric motor generator 32 also has an electrically-powered function of rotatively driving the compressor 21 and the turbine 22.

The exhaust turbine turbocharger 12 includes a power conversion device 33. The power conversion device 33 includes a first power conversion unit 34, a power storage unit 35, and a second power conversion unit 36. The first power conversion unit 34 connected to the electric motor generator 32. When a regenerative operation of the electric motor generator 32 is performed, first power conversion unit 34 converts AC power generated by the electric motor generator 32 into DC power and outputs the DC power. The second power conversion unit 36 is connected to an inboard power system 37. When the regenerative operation of the electric motor generator 32 is performed, the second power conversion unit 36 converts the DC power from the first power conversion unit 34 into three-phase AC power suitable for the inboard power system and outputs the three-phase AC power to the inboard power system 37. The power storage unit 35 is connected to a location between the first power conversion unit 34 and the second power conversion unit 36 and stores the DC power from the first power conversion unit 34 as much as a predetermined amount. The power storage unit 35 is provided for smoothing power which is output to the second power conversion unit 36. When a regenerative operation of the electric motor generator 32 starts, the power storage unit 35 outputs the stored power to the second power conversion unit 36. After the regenerative operation starts, the power output to the second power conversion unit 36 output from the electric motor generator 32 via the first power conversion unit 34.

In addition when a power running operation or the electric motor generator 32 is performed, the second power conversion unit 36 converts three-phase AC power from the inboard power system 37 into DC power and outputs the DC power to the first power conversion unit 31. When the power running operation of the electric motor generator 32 is performed, the first power conversion unit 34 converts the DC power from the second power conversion unit 36 into AC power and outputs the AC power to the electric motor generator 32. The power storage unit 35 stores the DC power from the second power conversion unit 36 as much as a predetermined amount. The power storage unit 35 is provided for smoothing power which is output to the first power conversion unit 34. When a power running operation of the electric motor generator 32 starts, the power output to the power storage unit 35 outputs the stored power to the first power conversion unit 34. After the power running operation starts, the power output to the first power conversion unit 34 is output from the inboard power system 37 via the second power conversion unit 36.

Here, the configuration of the power conversion device 33 will not be described in detail. However, for example, the first power conversion unit 34 is a converter, the power storage unit 35 is a capacitor, and the second power conversion unit 36 is an inverter.

The auxiliary blower 41 is configured with a blower impeller 42 and a blower electric motor (motor) 43. The auxiliary blower 41 is driven when the marine diesel engine 10 starts, and then, the auxiliary blower 41 compresses gas such as air taken in through the intake pipe 13 via the compressor. Thereafter, the gas such as compressed air is pressure-fed to the intake manifold 15 via the intake pipe L1 through an intake pipe 16, as the combustion gas. The intake pipe 16 is provided so as to be parallel to the intake pipe L1, and the auxiliary blower 41 (blower impeller 42) is provided in the intake pipe L6. However, there is no need to provide the intake pipe 16 so as to be to parallel to the intake pipe L1. Without providing the intake pipe 16, only the intake pipe L1 may be provided and the auxiliary blower 41 may be provided in the intake pipe L1.

A control device 38 includes a first control device 38a controlling the electric motor generator 32, and a second control device 38b controlling the diesel engine main body 11.

The first control device 38a controls the first power conversion unit 34 and the second power conversion unit 36, thereby being able to control the electric motor generator 32. In other words, the first control device 38a controls the functions of the first power conversion unit 34 and the second power conversion unit 36 in accordance with a drive state (regenerative operation state or power running operation state) of the electric motor generator 32.

The second control device 38b can control driving the injectors (fuel supply devices) 18, the engine rotation starter device 24, and the auxiliary blower 41 the diesel engine main body 11. In addition, the second control device 38b controls driving each of the injectors and controls the fuel injection time and the fuel injection amount. Moreover, the second control device 38b controls opening and closing the opening-closing valves 26 configuring the engine rotation starter device 24 and controls the operation gas supply time and the operation gas supply amount with respect to the cylinder portions 13.

In the device for starting an internal combustion engine of the fifth embodiment, when the motoring start preparation signal 101 is input, the control device 38 operates the auxiliary blower 41 and pressure-feeds the combustion gas to the cylinder portions 13 via the intake manifold 15. When the engine rotation activation start signal 102 is input, the control device 38 repeats the release and the release-stop of the opening-closing valves 26 and supplies the operation gas to the diesel engine main body 11, thereby starting the air running. Accordingly, the engine rotational frequency is raised, and the turbine rotational frequency is raised. When the engine rotational frequency reaches the fuel-supply-starting rotational frequency, the control device 38 drives each of the injectors 18 and supplies fuel to the cylinder portions 13. When the turbine rotational frequency reaches the motoring starting rotational frequency, the control device 38 controls the second power conversion unit 36 such that the three-phase AC power from the inboard power system 37 is converted into DC power, and the DC power is stored in the power storage unit 35. When the voltage of the power storage unit 35 reaches the standby voltage, the control device 38 controls the first power conversion unit 34 such that the DC, power of the power storage unit 35 is converted into AC power and driving the electric motor generator 32 starts (catch-spin). Accordingly, power from the inboard power system 37 is output to the electric motor generator 32, and the turbine rotational frequency is raised. Then, the marine diesel engine 10 starts.

Here, starting method using the device for starting an internal combustion engine the fifth embodiment will be described in detail by using a flow chart and a time chart.

In the method for starting an internal combustion engine of the fifth embodiment, as illustrated in FIGS. 10 and 11, in Step S41, the control device 38 determines whether or not the motoring start preparation signal 101 is input. Here, when it is determined that the motoring start preparation signal 101 is not input (No), the control device 38 stands by without any chance. Meanwhile, when it is determined that the motoring start preparation signal 101 is input (Yes), in Step S42, the auxiliary blower 41 starts. In Step S43, the control device 38 determines whether or not the engine rotation activation start signal 102 is input. Here, when it is determined that the engine rotation activation start signal 102 is not input (No), the control device 38 stands by without any change. Meanwhile, when it is determined that the engine rotation activation start signal 102 is input (Yes), in Step S44, the release and the release-stop of the opening-closing valves 26 are repeated and the operation gas is supplied to the diesel engine main body 11 so as to execute the air running, thereby raising the engine rotational frequency.

Step S45, the control device 38 determines whether or not the engine rotational frequency reaches the fuel-supply-starting rotational frequency. Here, when it is determined that the engine rotational frequency does not reach the fuel-supply-starting rotational frequency (No), the control device 38 continues the air running. Meanwhile, when it is determined that the engine rotational frequency reaches the fuel-supply-starting rotational frequency (Yes), in Step S46, the control device 38 drives each of the injectors 18, and fuel is injected into the cylinder portions 13 (combustion chamber) of the diesel engine main body 11.

In Step S47, the control device 38 determines whether or not the turbine rotational frequency reaches the motoring starting rotational frequency. Here, when it is determined that the turbine rotational frequency does not reach the motoring starting rotational frequency (No), the turbine rotational frequency is further raised. When it is determined that the turbine rotational frequency reaches the motoring starting rotational frequency (Yes), in Step S48, the control device 38 controls the second power conversion unit 36 such that the three-phase AC power from the inboard power system 37 is converted into DC power and the DC power is stored in the power storage unit 35, that is, the precharge starts.

In S49, the control device 38 detects the DC bus voltage of the power storage unit 35, and the control device 38 determines whether or not the DC bus voltage of the power storage unit 35 reaches the standby voltage. Here, when it is determined that the DC bus voltage of the power storage unit 35 does not reach the standby voltage (No), the control device 38 continues the precharge. Meanwhile, when it is determined that the DC bus voltage of the power storage unit 35 reaches the standby voltage (Yes), the DC bus voltage is maintained at the standby voltage. In Step S50, the control device 38 controls the first power conversion unit 34 such that the DC power of the power storage unit 35 is converted into AC power, driving the electric motor generator 32 starts, and the control device 38 outputs power from the inboard power system 37 to the electric motor generator 32, thereby starting the motoring. In other words, by using the electric motor generator 32, the compressor 21 and the turbine 22 of the exhaust turbine turbocharger 12 are rotatively driven, and the turbine rotational frequency is raised.

In Step S51, the control device 38 determines whether or not the turbine rotational frequency reaches a specified turbine rotational frequency (for example, 3,000 rpm). Here, when it is determined that the turbine rotational frequency does not reach the specified turbine rotational frequency (No), the turbine rotational frequency is further raised. When it is determined that the turbine rotational frequency reaches the specified turbine rotational frequency Step S52, the control device 38 stops the auxiliary blower 41. Then, the marine diesel engine 10 can start while the engine rotational frequency rises to a rotational frequency equal to or greater than the specified rotational frequency.

In addition, the operation timing of the device for starting an internal combustion engine of the fifth embodiment will be described. As illustrated in FIGS. 10 and 12, at a time t41, when the motoring start preparation signal 101 is input, the auxiliary blower 41 starts. At a time t42, when the engine rotation activation start signal 102 is input, the air running is executed by repeating the release and the release-stop of the opening-closing valves 26. Accordingly, the engine rotational frequency rises. At a time t43, when the engine rotational frequency reaches the fuel-supply-starting rotational frequency, the injectors 18 are driven and fuel is injected into the cylinder portions 13 (combustion chambers).

Then, the marine diesel engine 10 starts combustion inside the cylinder portions 13 (combustion chambers), and the engine rotational frequency rises. At a time t44, when the turbine rotational frequency reaches the motoring starting rotational frequency, the second power conversion unit 36 converts the three-phase AC power from the inboard power system 37 into DC power and stores the DC power in the power storage unit 35. Accordingly, the precharge starts and the DC bus voltage of the power storage unit 35 rises. At a time t45, when the DC bus voltage of the power storage unit 35 becomes the standby voltage, the DC bus voltage is maintained at the standby voltage. At the same time, the first power conversion unit 34 converts the DC power of the power storage unit into AC power, driving the electric motor generator 32 starts, and power from the inboard power system 37 is output to the electric motor generator 32. Accordingly, the motoring starts, and the turbine rotational frequency of the exhaust turbine turbocharger 12 rises. At a time t46, when the turbine rotational frequency reaches the specified turbine rotational frequency, the auxiliary blower 41 stops. Then, the marine diesel engine 10 starts while the engine rotational frequency rises to the specified rotational frequency.

As described above, in the device for starting an internal combustion engine of the fifth embodiment, when the motoring start preparation signal 101 is input, the control device 38 operates the auxiliary blower 41 and pressure-feeds the operation gas to the cylinder portions 13. When the engine rotation activation start signal 102 is input, the control device 38 repeats the release and the release-stop of the opening-closing valves 26 and supplies the operation gas to the cylinder portions 13, thereby raising the engine rotational frequency. When the engine rotational frequency reaches the fuel-supply-starting rotational frequency, the control device 38 drives each of the injectors 18 and supplies fuel to the cylinder portions 13. When the turbine rotational frequency reaches the motoring starting rotational frequency, the control device 38 converts the three-phase AC power from the inboard power system 37 into DC power, stores the DC power in the power storage unit 35, and converts the DC power of the power storage unit 35 into AC power such that driving the electric motor generator 32 starts. Accordingly, power from the inboard power system 37 is output to the electric motor generator 32, and the turbine rotational frequency is raised.

Accordingly, the amount of the combustion gas to be supplied to the cylinder portions 13 is ensured by using the auxiliary blower 41 and the marine diesel engine 10 starts by using the electric motor generator 32 for driving the exhaust turbine turbocharger 12. Thus, it is possible to improve the starting performance of the marine diesel engine 10.

Sixth Embodiment

Figure 13:
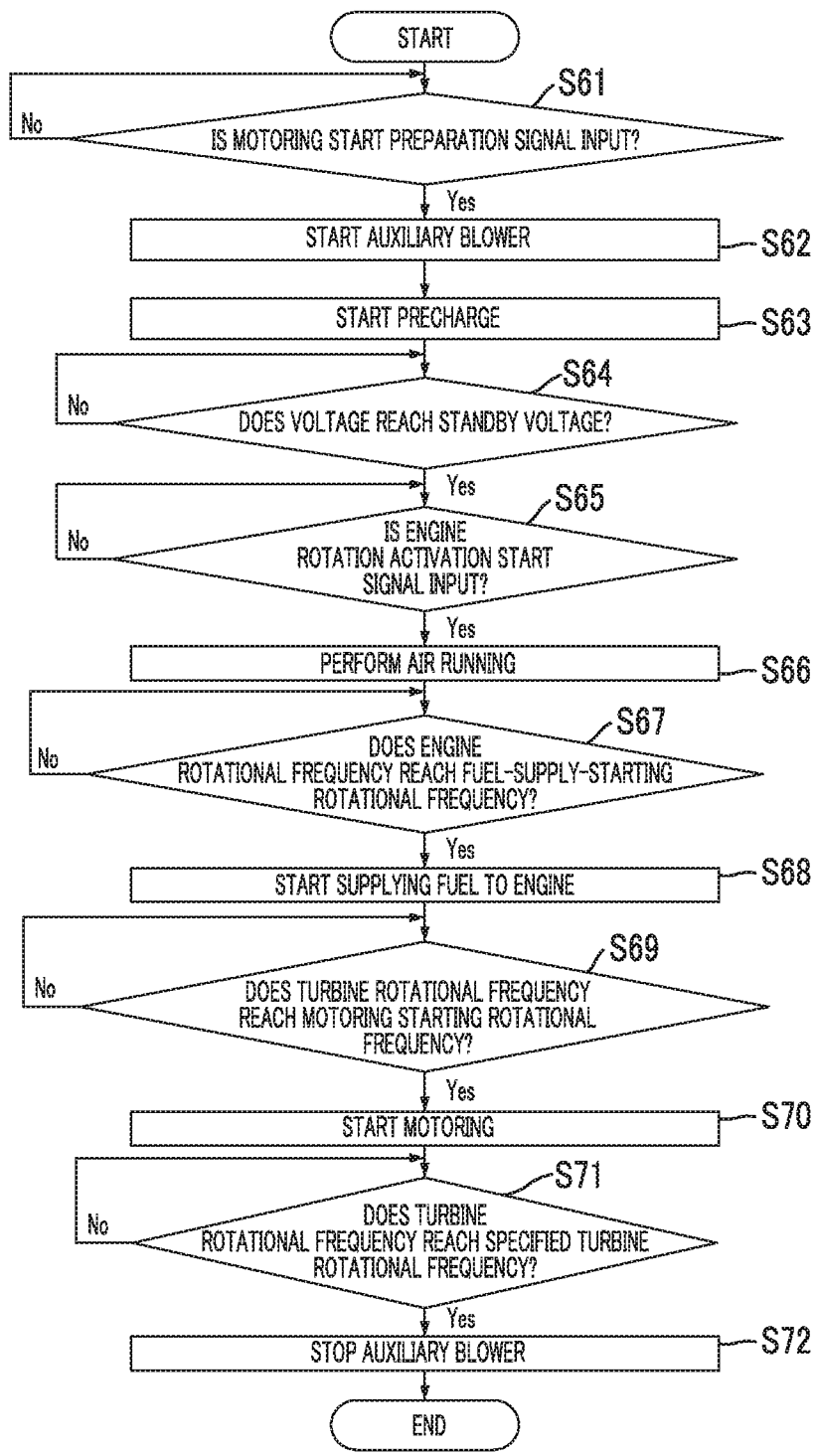
FIG. 13 is a flow chart illustrating a method for starting an internal combustion engine of a sixth embodiment.
Figure 14:
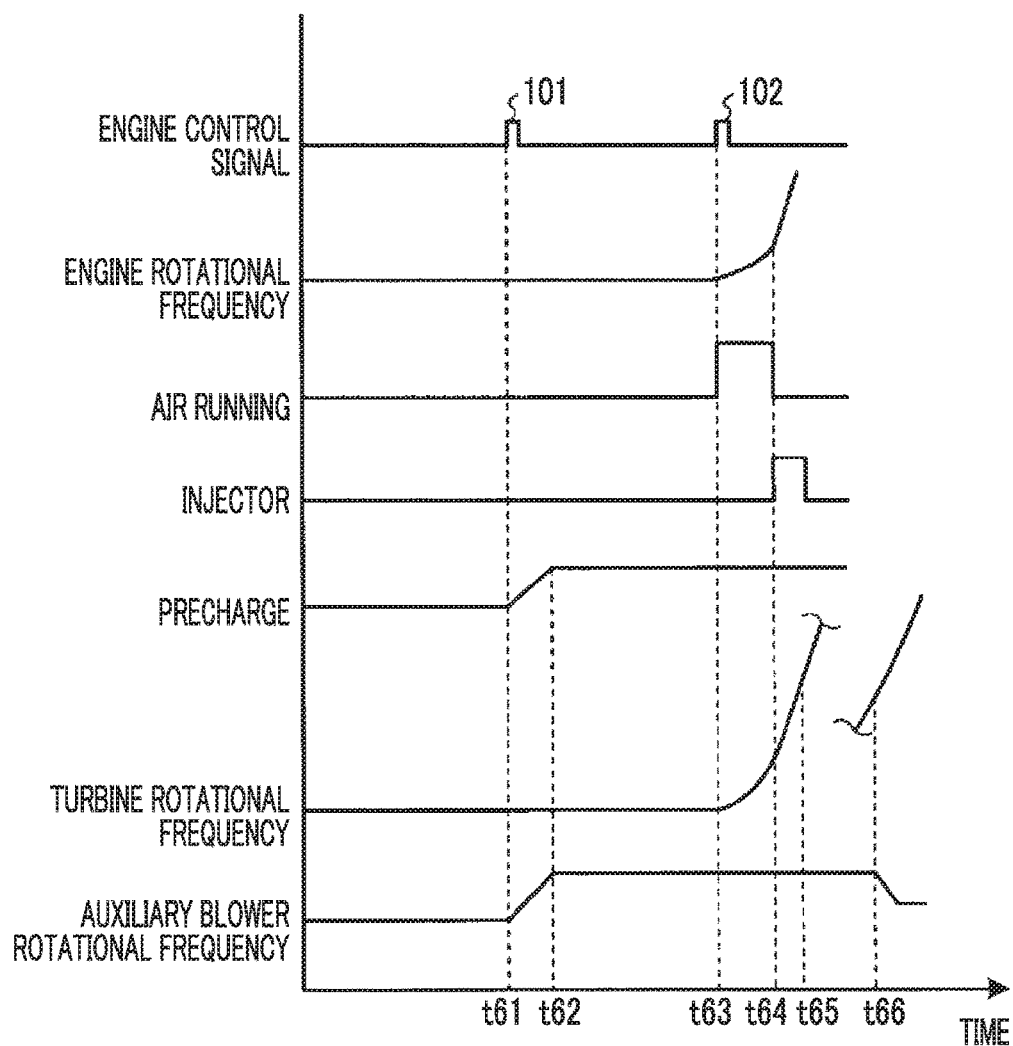
FIG. 14 is a time flow chart illustrating the method for starting an internal combustion engine.

FIG. 13 is a flow chart illustrating a method for starting an internal combustion engine of a sixth embodiment. FIG. 14 is a time flow chart illustrating the method for starting an internal combustion engine. The basic configuration of the device for starting an internal combustion engine of the present embodiment is a configuration similar to that of the fifth embodiment described above. Description will be given with reference to FIG. 10. The same reference sign will be applied to a member having a function similar to that of the fifth embodiment described above, and detailed description thereof will be omitted.

In the device for starting an internal combustion engine of the sixth embodiment, as illustrated in FIG. 10, when the motoring start preparation signal 101 is input, the control device 38 controls the second power conversion unit 36 such that the three-phase AC power from the inboard power system 37 is converted into DC power, the DC power is stored in the power storage unit 35, and the standby voltage is maintained. In addition, the control device 38 operates the auxiliary blower 41 and pressure-feeds the operation gas to the cylinder portions 13. When the engine rotation activation start signal 102 is input, the control device 38 repeats the release and the release-stop of the opening-closing valves 26 and supplies the combustion gas to the diesel engine main body 11, thereby starting the air running. Accordingly, the engine rotational frequency is raised, and the turbine rotational frequency is raised. When the engine rotational frequency reaches the fuel-supply-starting rotational frequency, the control device 38 drives each of the injectors 18 and supplies fuel to the cylinder portions 13. When the turbine rotational frequency reaches the motoring starting rotational frequency, the control device 38 controls the first power conversion unit 34 such that the DC power of the power storage unit 35 is converted into AC power and driving the electric motor generator 32 starts (catch-spin). Accordingly, power from the inboard power system 37 is output to the electric motor generator 32, and the turbine rotational frequency is raised. Then, the marine diesel engine 10 starts.

Here, a starting method using the device for starting an internal combustion engine of the sixth embodiment will be described in detail by using a flow chart and a time chart.

In the method for starting an internal combustion engine of the sixth embodiment, as illustrated in FIGS. 10 and 13, in Step S61, the control device 38 determines whether or not the motoring start preparation signal 101 is input. Here, when it is determined that the motoring start preparation signal 101 is not input (No), the control device 38 stands by without any change. Meanwhile, when it is determined that the motoring start preparation signal 101 is input (Yes), in Step S62, the auxiliary blower 41 starts. In Step S63, the control device 38 controls the second power conversion unit 36 such that the three-phase AC power from the inboard power system 37 is converted into DC power and the DC power is stored in the power storage unit 35, that is, the precharge starts.

In Step S64, the control device 38 detects the DC bus voltage of the power storage unit 35, and the control device 38 determines whether or not the DC bus voltage of the power storage unit 35 reaches the standby voltage. Here, when it is determined that the DC bus voltage of the power storage unit 35 does not reach the standby voltage (No), the control device 38 continues the precharge. Meanwhile, when it is determined that the DC bus voltage of the power storage unit 35 reaches the standby voltage (Yes), the DC bus voltage is maintained at the standby voltage.

In Step S65, the control device 38 determines whether or not the engine rotation activation start signal 102 is input. Here, when it is determined that the engine rotation activation start signal 102 is not input (No), the control device 38 stands by without any change. Meanwhile, when it is determined that the engine rotation activation start signal 102 is input (Yes), in Step S66, the release and the release-stop of the opening-closing valves 26 are repeated and the operation gas is supplied to the diesel engine main body 11 so as to execute the air running, thereby raising the engine rotational frequency.

In Step S67, the control device 38 determines whether or not the engine rotational frequency reaches the fuel-supply-starting rotational frequency. Here, when it is determined that the engine rotational frequency does not reach the fuel-supply-starting rotational frequency (No), the control device 38 continues the air running. Meanwhile, when it determined that the engine rotational frequency reaches the fuel-supply-starting rotational frequency (Yes), in Step S68, the control device 38 drives each of the injectors 18, and fuel is injected into the cylinder portions 13 (combustion chamber) of the diesel engine main body 11.

In Step S69, the control device 38 determines whether or not the turbine rotational frequency reaches the motoring starting rotational frequency. Here, when it is determined that the turbine rotational frequency does not reach the motoring starting rotational frequency (No), the turbine rotational frequency is further raised. When it is determined that the turbine rotational frequency reaches the motoring starting rotational frequency (Yes), in Step S70, the control device 38 controls the first power conversion unit 34 such that the DC power of the power storage unit 35 is converted into AC power, driving the electric motor generator 32 starts, and the control device 38 outputs power from the inboard power system 37 to the electric motor generator 32, thereby starting the motoring. In other words, by using the electric motor generator 32, the compressor 21 and the turbine 22 of the exhaust turbine turbocharger 12 are rotatively driven, and the turbine rotational frequency is raised.

In S71, the control device 38 determines whether or not the turbine rotational frequency reaches the specified turbine rotational frequency (for example, 3,000 rpm). Here, when it is determined that the turbine rotational frequency does not reach the specified turbine rotational frequency (No), the turbine rotational frequency is further raised. When it is determined that the turbine rotational frequency reaches the specified turbine rotational frequency (Yes), in Step S72, the control device 38 stops the auxiliary blower 41. Then, the marine diesel engine 10 can start while the engine rotational frequency rises to a rotational frequency equal to or greater than the specified rotational frequency.

In addition, the operation timing of the device for starting an internal combustion engine of the sixth embodiment will be described. As illustrated in FIGS. 10 and 14, at a time t61, when the motoring start preparation signal 101 is input, the second power conversion unit 36 converts the three-phase AC power from the inboard power system 37 into DC power and stores the DC power in the power storage unit 35. Accordingly, the precharge starts and the DC bus voltage of the power storage unit 35 rises. In addition, in this case, the auxiliary blower 41 starts. At a time t62, when the DC bus voltage of the power storage unit 35 becomes the standby voltage, the DC bus voltage is maintained at the standby voltage. At a time t63, when the engine rotation activation start signal 102 is input, the air running is executed by repeating the release and the release-stop of the opening-closing valves 26. Accordingly, the engine rotational frequency rises. At a time t64, when the engine rotational frequency reaches the fuel-supply-starting rotational frequency, the injectors 18 are driven and fuel is injected into the cylinder portions 13 (combustion chambers).

Then, the marine diesel engine 10 starts combustion inside the cylinder portions 13 (combustion chambers), and the engine rotational frequency rises. At a time t65, when the turbine rotational frequency reaches the motoring starting rotational frequency, the first power conversion unit 34 converts the DC power of the power storage unit 35 into AC power, driving the electric motor generator 32 starts, and power from the inboard power system 37 is output to the electric motor generator 32. Accordingly, the motoring starts, and the turbine rotational frequency of the exhaust turbine turbocharger 12 rises. At a time t66, when the turbine rotational frequency reaches the specified turbine rotational frequency, the auxiliary blower 41 stops. Then, the marine diesel engine 10 starts while the engine rotational frequency rises to the specified rotational frequency.

As described above, in the device for starting an internal combustion engine of the sixth embodiment, when the motoring start preparation signal 101 is input, the control device 38 converts the three-phase AC power from the inboard power system 37 into DC power, stores the DC power in the power storage unit 35, and maintains the standby voltage. In addition, the control device 38 operates the auxiliary blower 41 and pressure-feeds the operation gas to the cylinder portions 13. When tale engine rotation activation start signal 102 is input, the control device 38 repeats the release and the release-stop of the opening-closing valves 26 and supplies the operation gas to the cylinder portions 13, thereby raising the engine rotational frequency. When the engine rotational frequency reaches the fuel-supply-starting rotational frequency, the control device 38 drives each of the injectors 18 and supplies fuel to the cylinder portions 13. When the turbine rotational frequency reaches the motoring starting rotational frequency, the DC power of the power storage unit 35 is converted into AC power such that, driving the electric motor generator 32 starts, power from the inboard power system 37 is output to the electric motor generator 32, and the turbine rotational frequency is raised.

Accordingly, the amount of the combustion gas to be supplied to the cylinder portions is ensured by using the auxiliary blower 41 and the marine diesel engine 10 starts by using the electric motor generator 32 for driving the exhaust turbine turbocharger 12. Thus, it is possible to improve the starting performance of the marine diesel engine 10.

In the embodiments described above, the exhaust turbine turbocharger 12 as a turbocharger of the present invention is the hybrid turbocharger, and the electric motor of the present invention is the electric motor generator 32. However the embodiments are not limited to this configuration. For example, the electric motor generator 32 may be a simple electric motor (motor), and a battery as the power storage unit may be connected to this electric motor.

In addition, in the third to sixth embodiments described above, the control device 38 controls the first bower conversion unit 34 such that the DC power of the power storage unit 35 is converted into AC power and catch-spin of driving the electric motor generator 32 is executed. However, for example, the electric motor generator 32 may be provided with a rotation position detecting sensor such as an encoder. In this case, the start timing of the electric motor generator 32 can be highly accurate.

In addition, in each of the embodiments described above, the engine rotation starter device 24 is configured with the operation gas supply source 25, the opening-closing valves 26, and the operation gas supply pipe 15. However the embodiment is not limited to this configuration. For example, the engine rotation starter device 24 may be an electric motor, the electric motor may be connected to the crankshaft of the internal combustion engine, and the crankshaft may be forcibly and rotatively driven by the electric motor.

REFERENCE SIGNS LIST

10 MARINE DIESEL ENGINE (INTERNAL COMBUSTION ENGINE)
11 DIESEL ENGINE MAIN BODY
12 EXHAUST TURBINE TURBOCHARGER (TURBOCHARGER)
13 CYLINDER PORTION
18 INJECTOR (FUEL SUPPLY DEVICE)
21 COMPRESSOR
22 TURBINE
24 ENGINE ROTATION STARTER DEVICE (INTERNAL COMBUSTION ENGINE ROTATION STARTER DEVICE)
25 OPERATION GAS SUPPLY SOURCE
26 OPENING-CLOSING VALVE
32 ELECTRIC MOTOR GENERATOR (ELECTRIC MOTOR)
33 POWER CONVERSION DEVICE
34 FIRST POWER CONVERSION UNIT
35 POWER STORAGE UNIT
36 SECOND POWER. CONVERSION UNIT
37 INBOARD POWER SYSTEM
38 CONTROL DEVICE
41 AUXILIARY BLOWER
L1, L3 INTAKE PIPE
L2, L4 EXHAUST PIPE
L5 OPERATION GAS SUPPLY PIPE

The invention claimed is:
1. A device for starting an internal combustion engine, comprising:
a compressor that supplies combustion gas to the internal combustion engine;
an electric motor that drives the compressor;

an internal combustion engine rotation starter device that supplies operation gas without supplying any fuel to the internal combustion engine to drive the internal combustion engine;

a fuel supply device that supplies fuel to the internal combustion engine; and a control device that controls driving the electric motor, the internal combustion engine rotation starter device, and the fuel supply device, wherein the control device acquires a measurement value of a rotational frequency of the compressor, an internal combustion engine rotation-activation-starting rotational frequency set in advance, and a fuel-supply-starting rotational frequency set in advance, when the rotational frequency of the compressor reaches the internal combustion engine rotation-activation-starting rotational frequency, the control device drives the internal combustion engine rotation starter device such that the internal combustion engine rotation starter device to supply the operation gas to the internal combustion engine to cause the internal combustion engine to start air running thereby raising the rotational frequency of the internal combustion engine, and when the rotational frequency of the internal combustion engine reaches the fuel-supply-starting rotational frequency by the air running, the control device starts driving the fuel supply device such that the fuel supply device supply fuel to the internal combustion engine to start an operating of the internal combustion engine due to combustion.

2. The device for starting the internal combustion engine, according to claim 1, wherein there is provided a power storage unit which supplies power to the electric motor, and the power storage unit receives power from an external power source device and stores the power, and wherein after storing power in the power storage unit starts and a voltage of the power storage unit reaches a standby voltage set in advance, the control device starts driving the compressor, and when the rotational frequency of the compressor reaches the internal combustion engine rotation-activation-starting rotational frequency, the control device starts driving the internal combustion engine rotation starter device.

3. The device for starting the internal combustion engine, according to claim 2, wherein when the voltage of the power storage unit reaches the standby voltage, after driving the electric motor starts by power of the power storage unit and the rotational frequency of the compressor becomes the internal combustion engine rotation-activation-starting rotational frequency, the control device maintains the rotational frequency of the compressor at the internal combustion engine rotation-activation-starting rotational frequency, and in a case where an internal combustion engine rotation activation signal is input to the control device, the control device starts driving the internal combustion engine rotation starter device.

4. The device for starting the internal combustion engine, according to claim 2, wherein in a case where the voltage of the power storage unit reaches the standby voltage and the internal combustion engine rotation activation signal is input to the control device, the control device starts driving the electric motor by power of the power storage unit, and when the rotational frequency of the compressor reaches the internal combustion engine rotation-activation-starting rotational frequency, the control device starts driving the internal combustion engine rotation starter device.

5. A method for starting an internal combustion engine, comprising:

a step of starting storing power in a power storage unit;

a step of driving a compressor by driving an electric motor by power of the power storage unit after a voltage of the power storage unit reaches a standby voltage set in advance;

a step of acquiring a measurement value of a rotational frequency of the compressor, an internal combustion engine rotation-activation-starting rotational frequency set in advance, and a fuel-supply-starting rotational frequency set in advance;

a step of starting rotation of the internal combustion engine by starting air running supplying operation gas without supplying any fuel to the internal combustion engine to raise rotational frequency of the internal combustion engine, when the rotational frequency of the compressor reaches the internal combustion engine rotation-activation-starting rotational frequency; and a step of supplying fuel to the internal combustion engine to start an operating of the internal combustion engine due to combustion when the rotational frequency of the internal combustion engine reaches the fuel-supply-starting rotational frequency by the air running.

6. The method for starting the internal combustion engine, according to claim 5, wherein after the rotational frequency of the compressor reaches the internal combustion engine rotation-activation-starting rotational frequency, the internal combustion engine rotation-activation-starting rotational frequency is maintained and driving an internal combustion engine rotation starter device starts upon a reception of an internal combustion engine rotation activation signal.

7. The method for starting the internal combustion engine, according to claim 5, wherein the voltage of the power storage unit is maintained after reaching the standby voltage, and driving the internal combustion engine rotation starter device starts after driving the electric motor starts by power of the power storage unit upon a reception of an internal combustion engine rotation activation signal and the rotational frequency of the compressor reaches the internal combustion engine rotation-activation-starting rotational frequency.

* * * * *